Aug. 2, 1966  E. A. VERRINDER  3,263,827
ARTICLE HANDLING APPARATUS
Filed Sept. 20, 1963  24 Sheets-Sheet 1
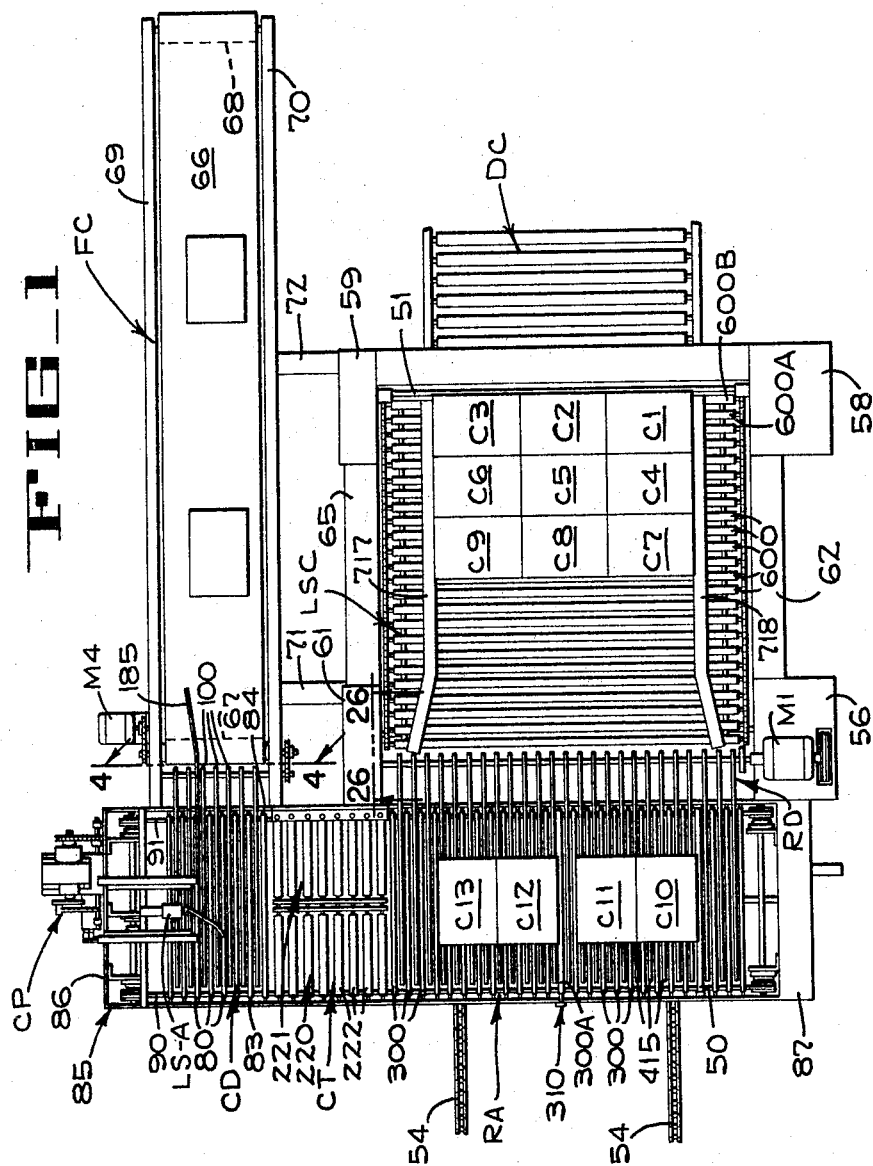
INVENTOR
ERNEST A. VERRINDER
BY Hans G. Hoffmeister
ATTORNEY

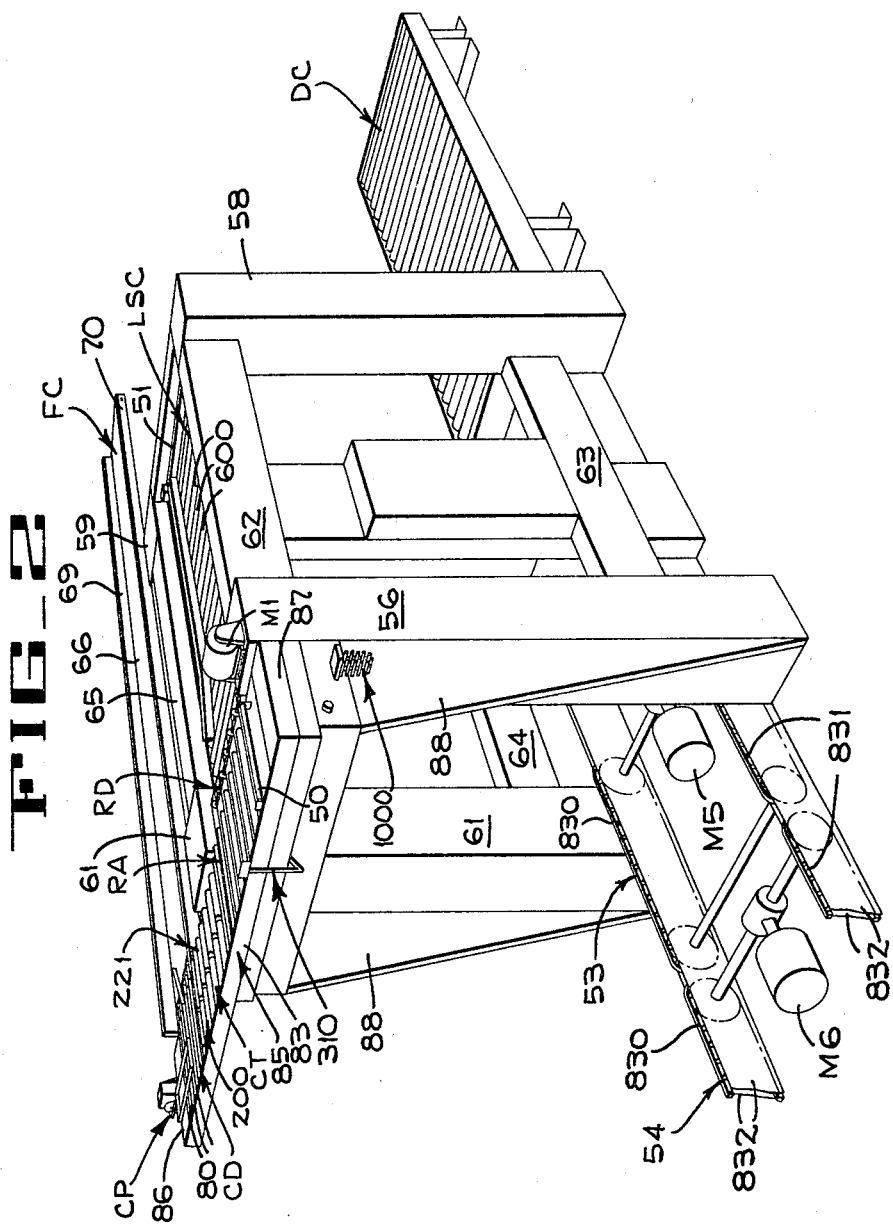

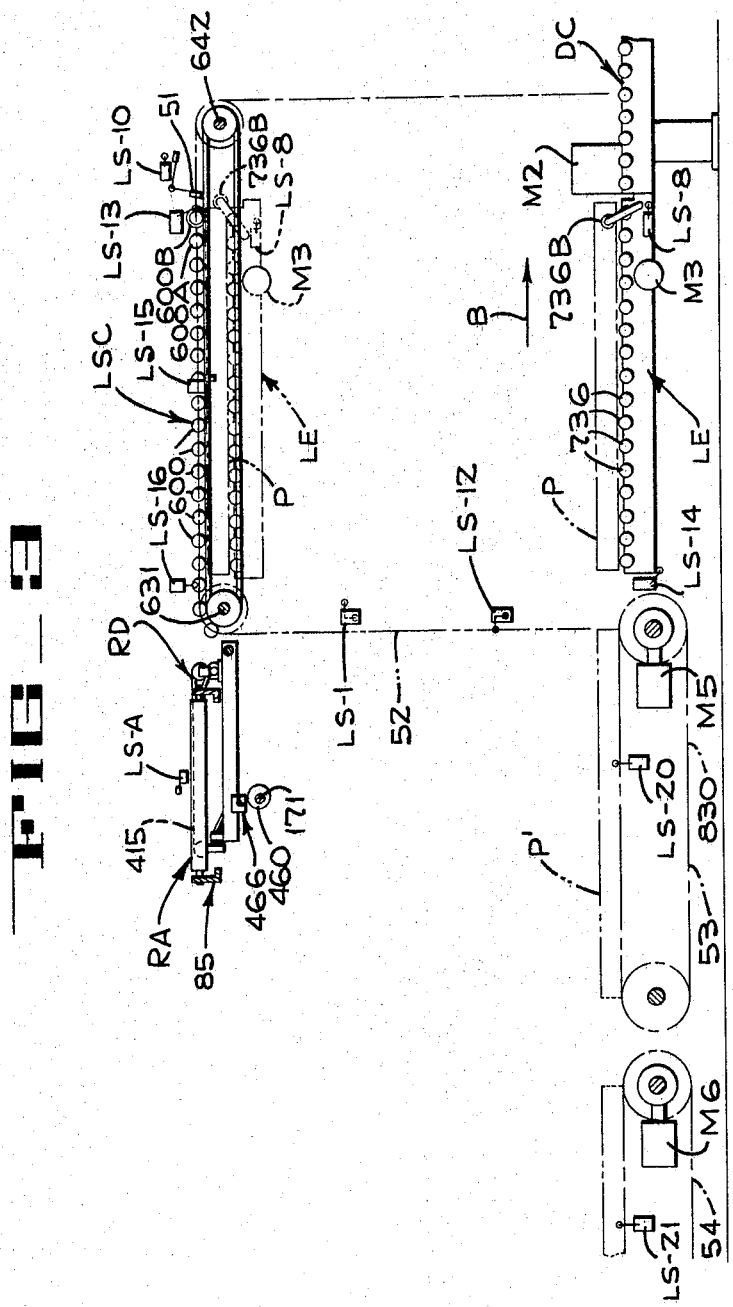

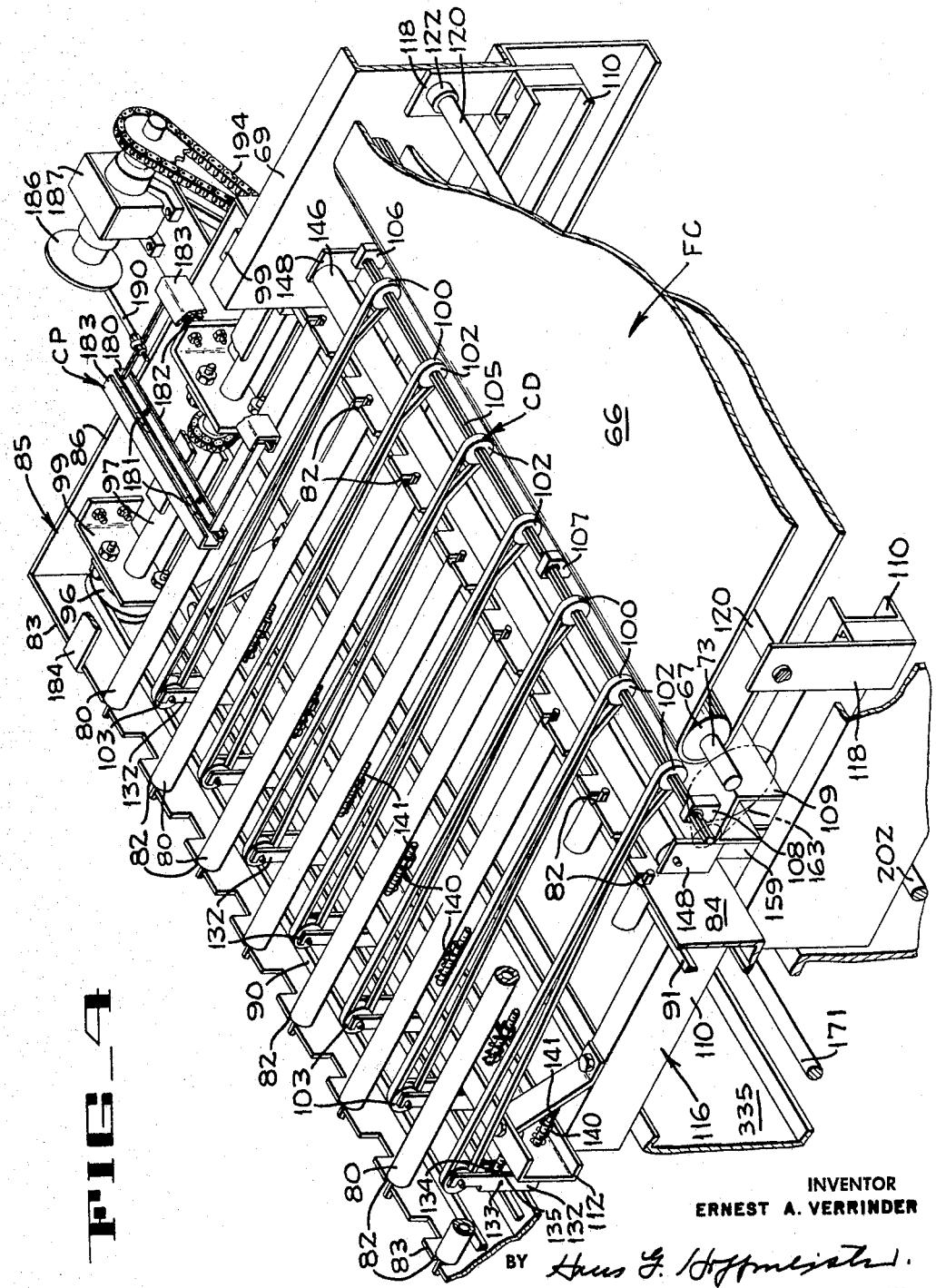

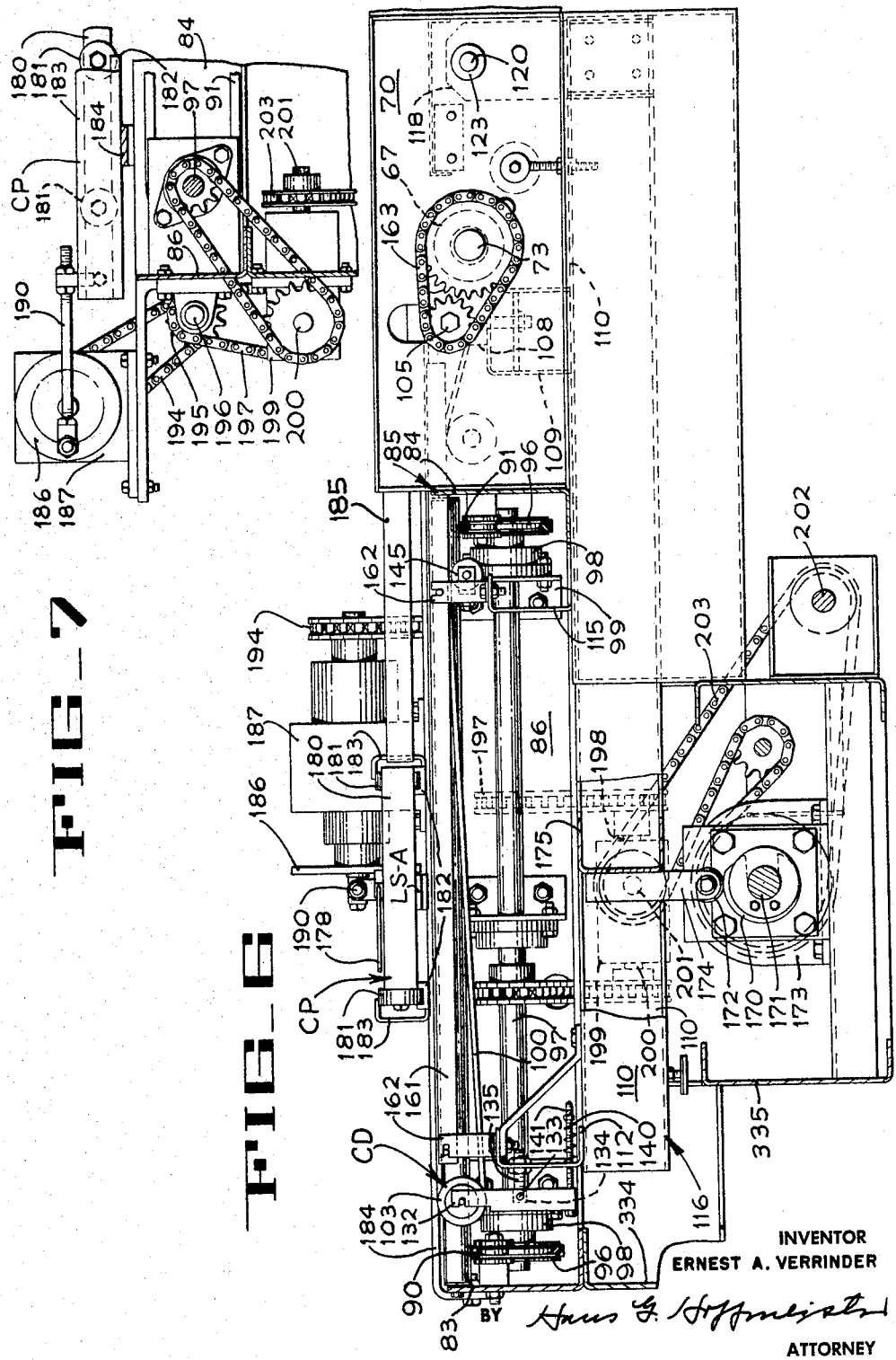

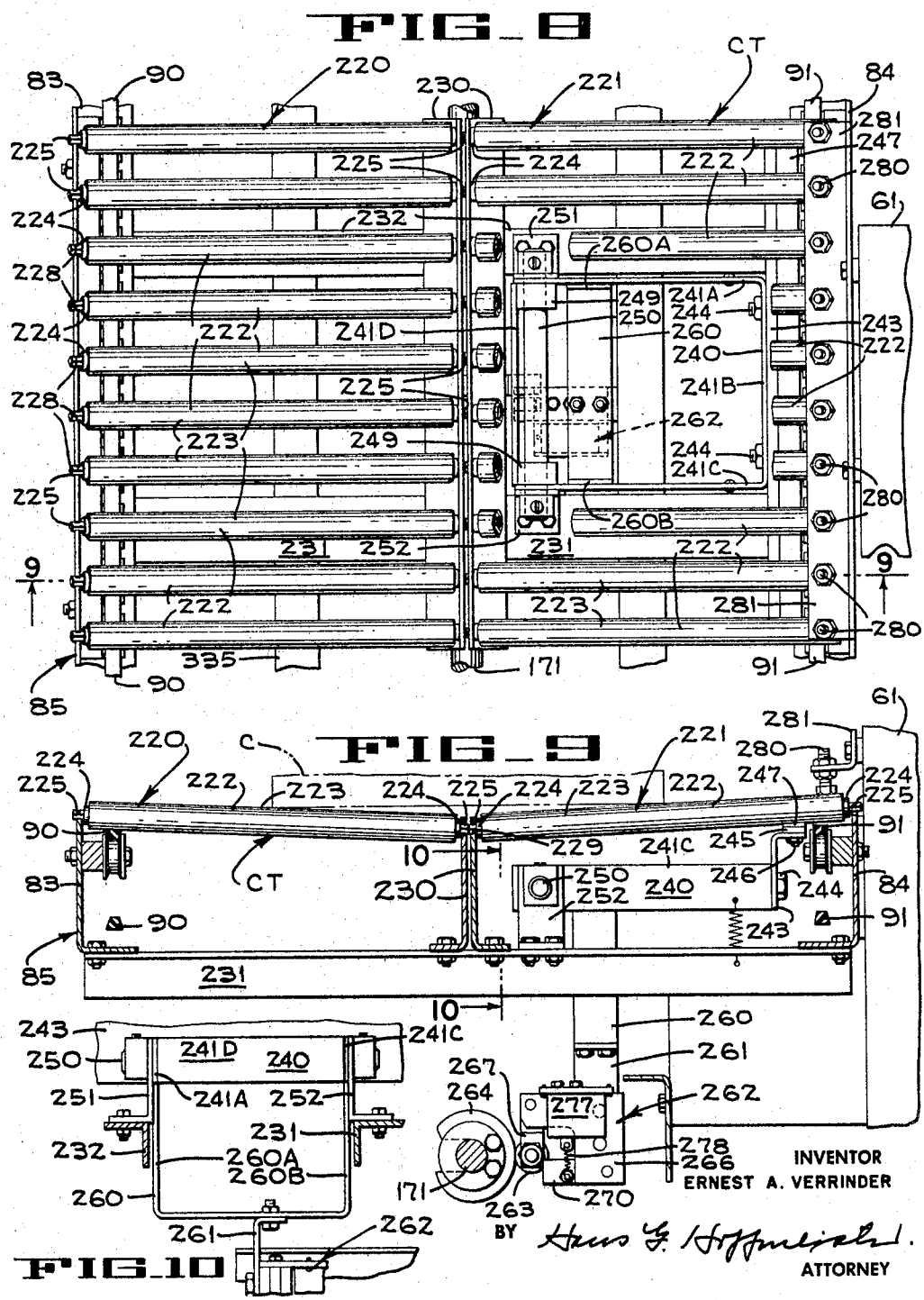

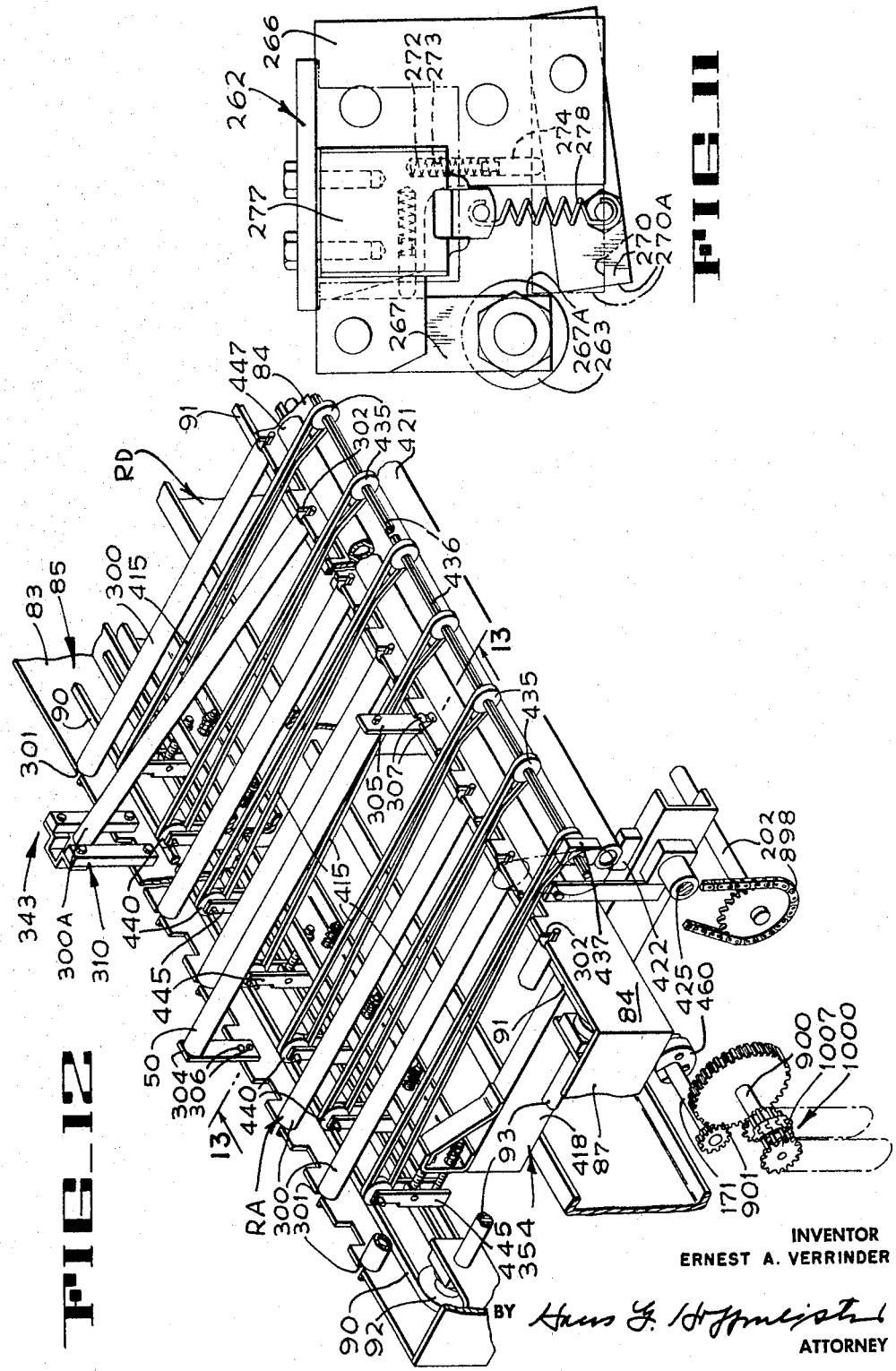

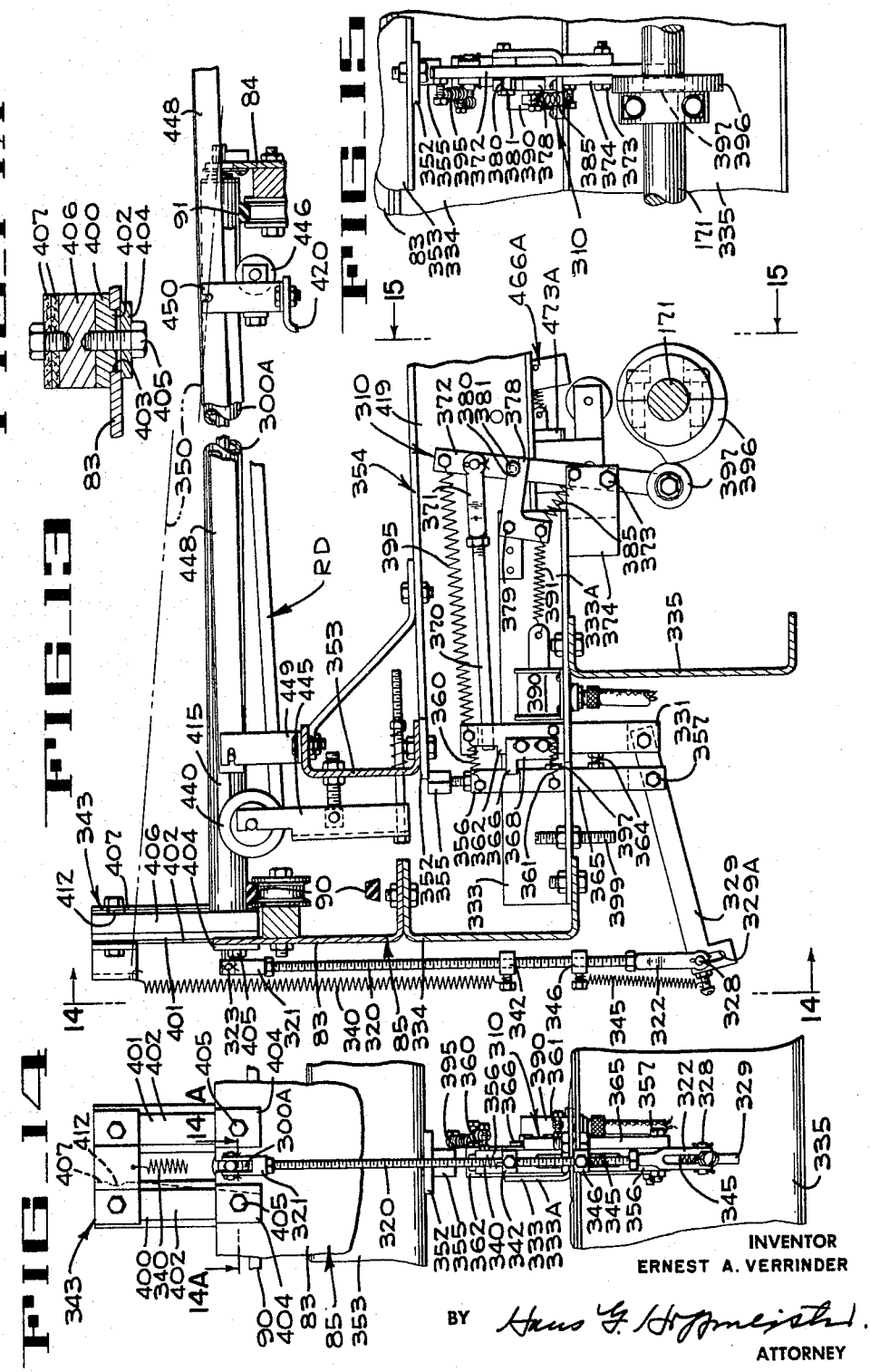

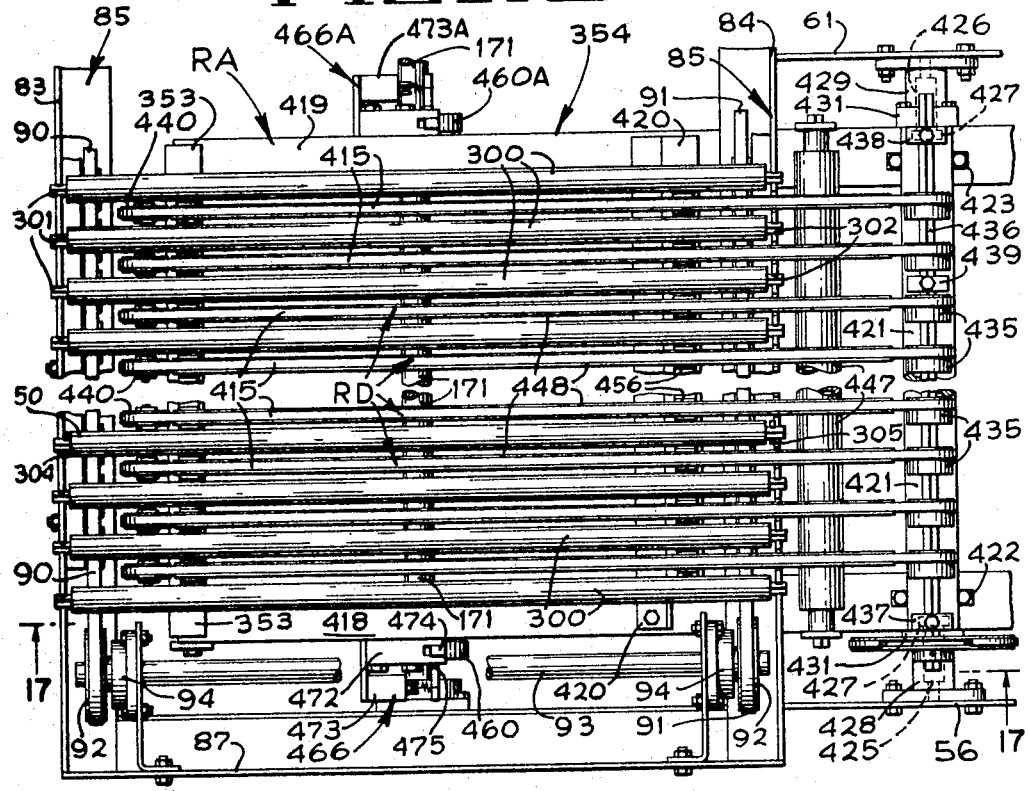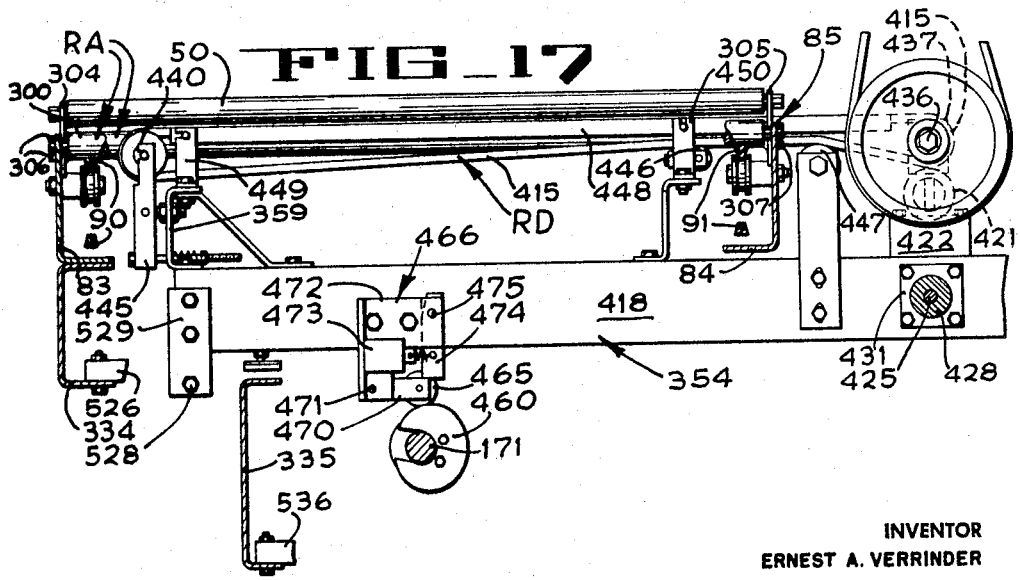

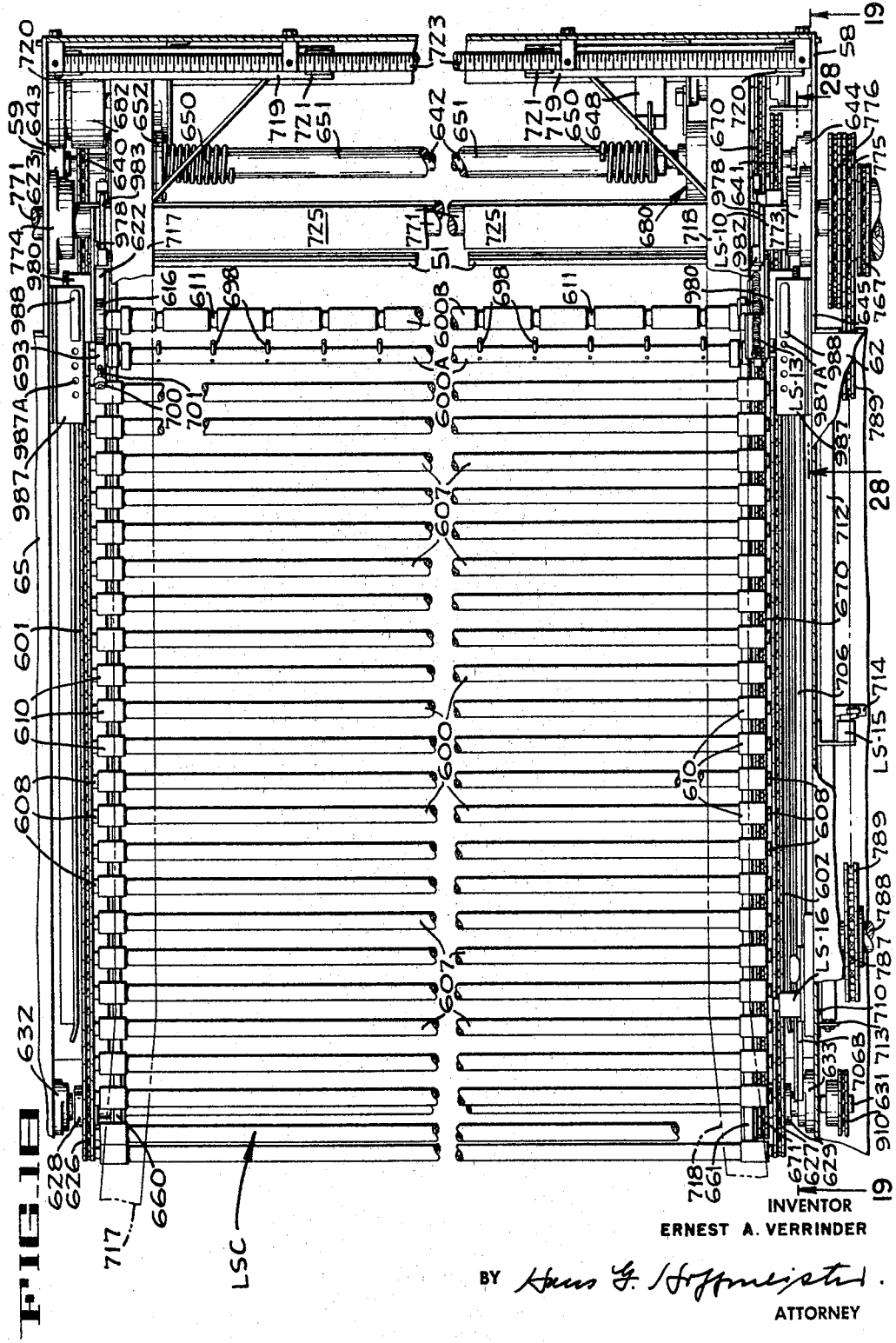

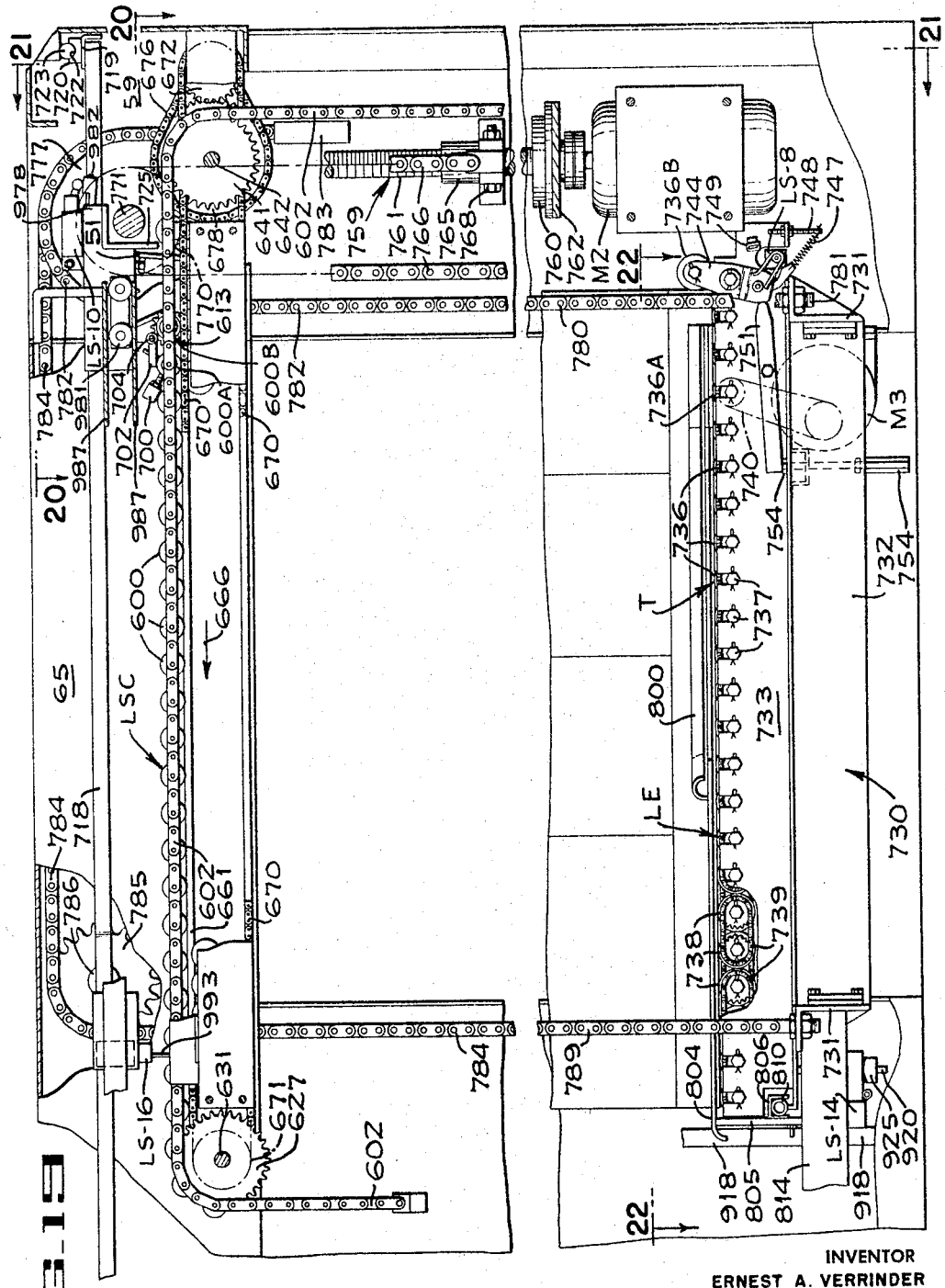

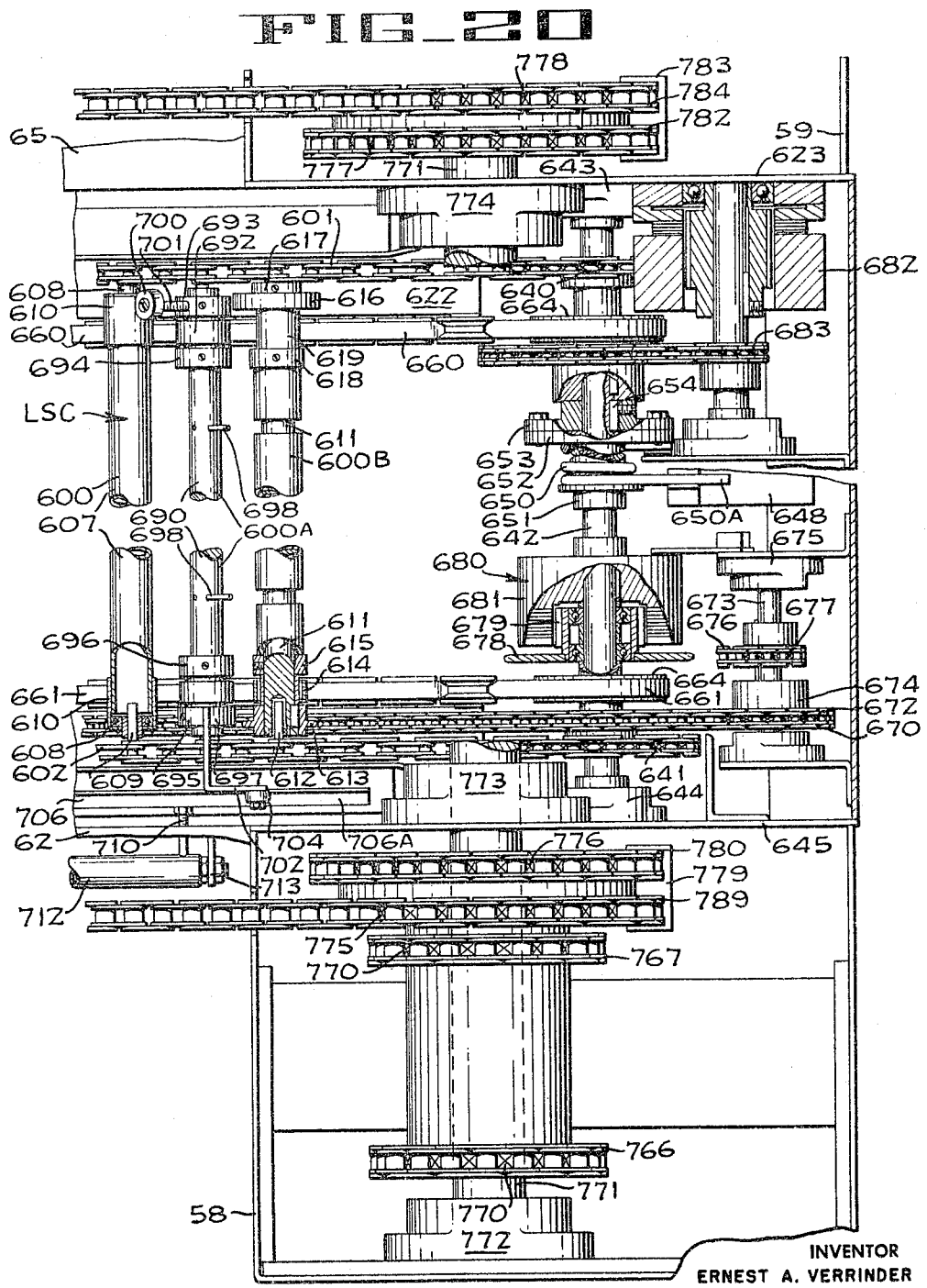

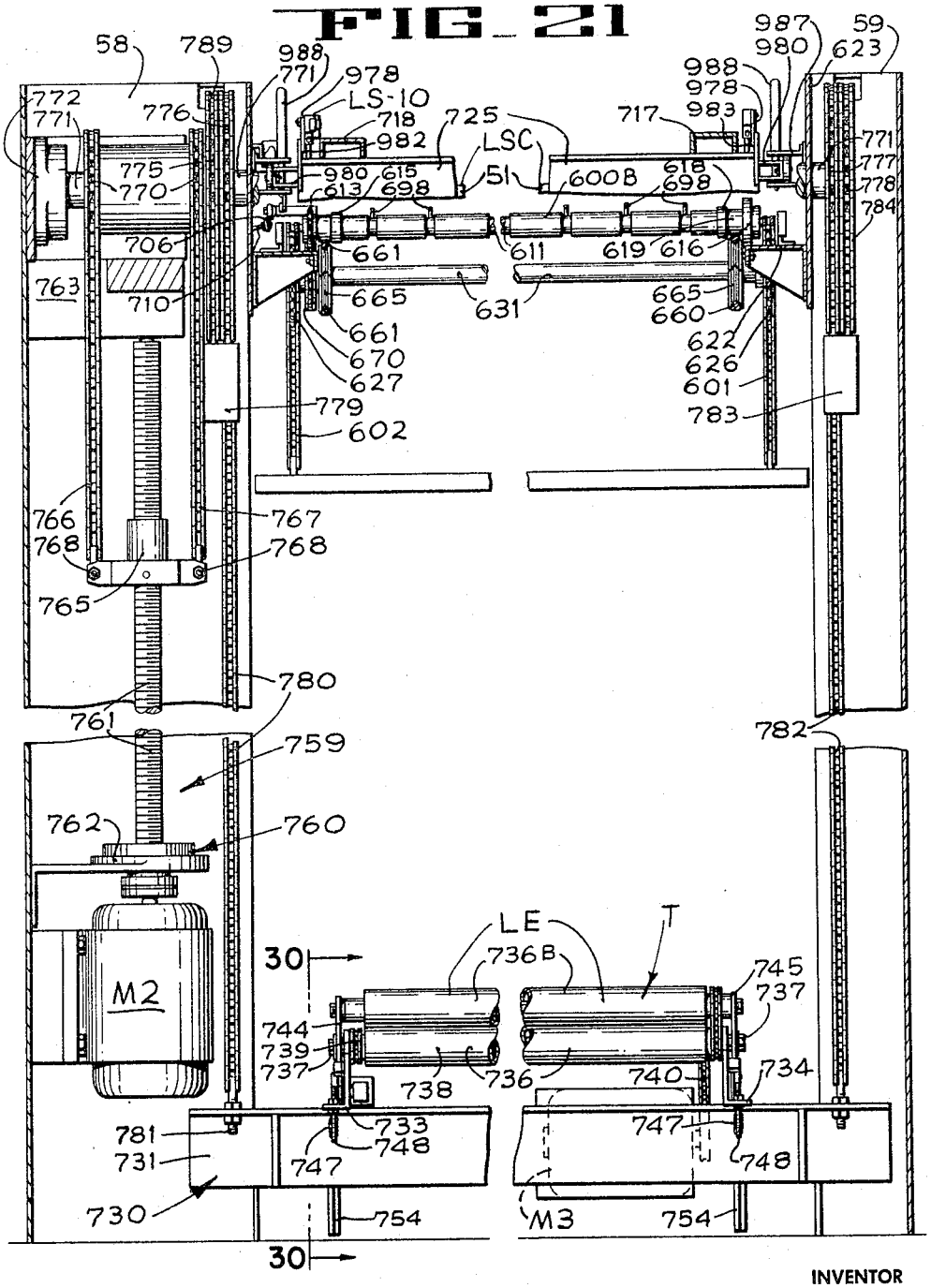

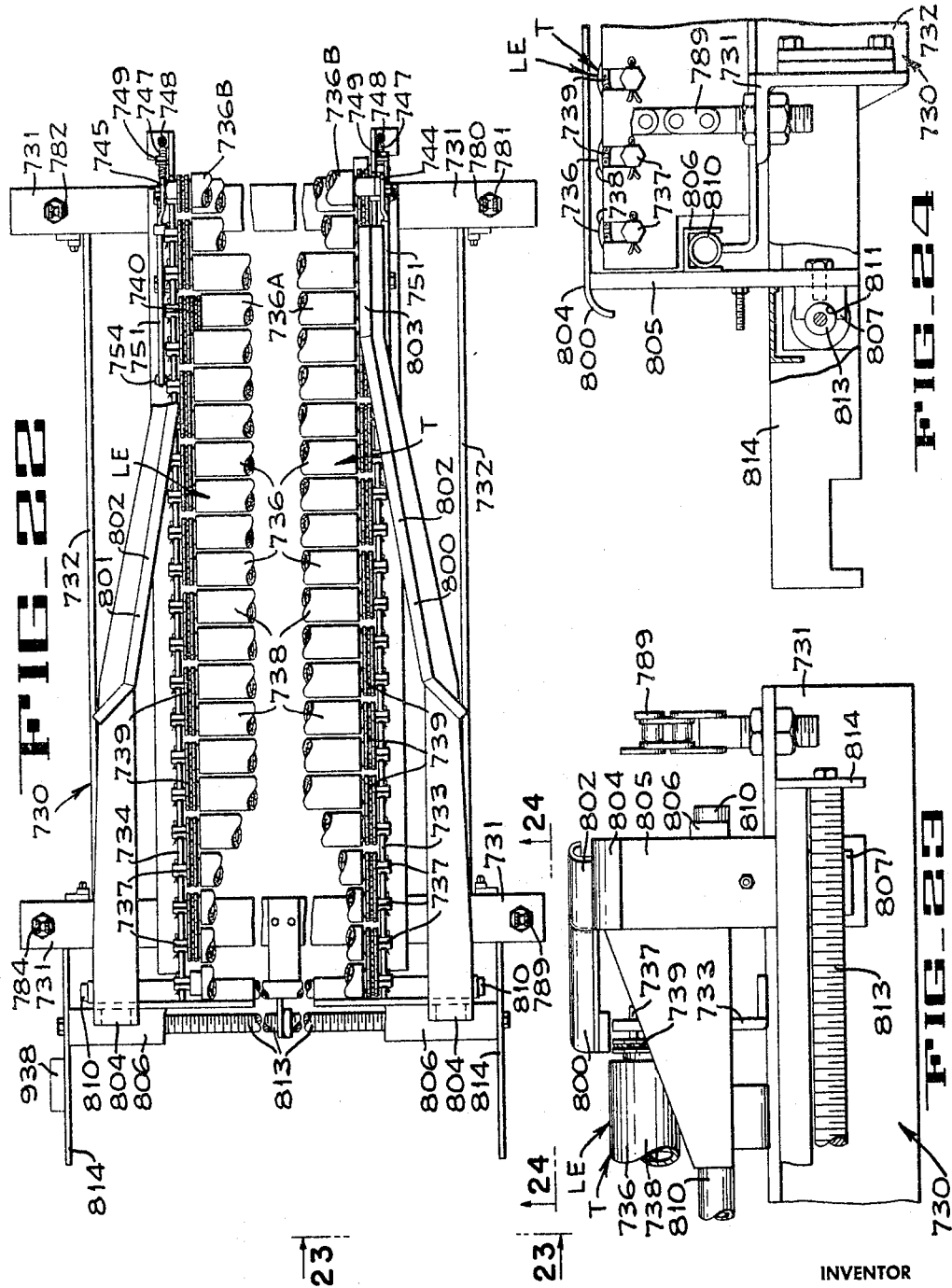

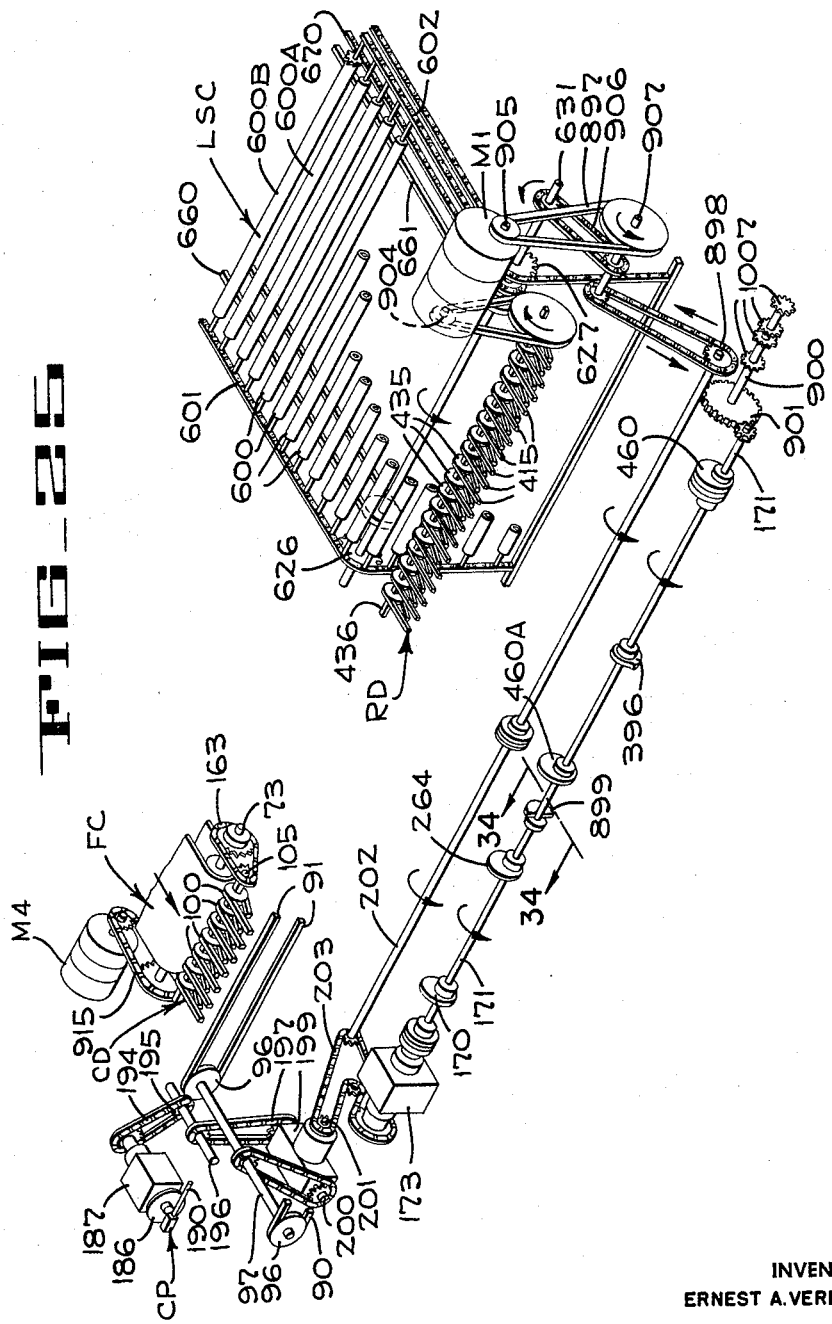

Aug. 2, 1966   E. A. VERRINDER   3,263,827
ARTICLE HANDLING APPARATUS
Filed Sept. 20, 1963   24 Sheets-Sheet 17
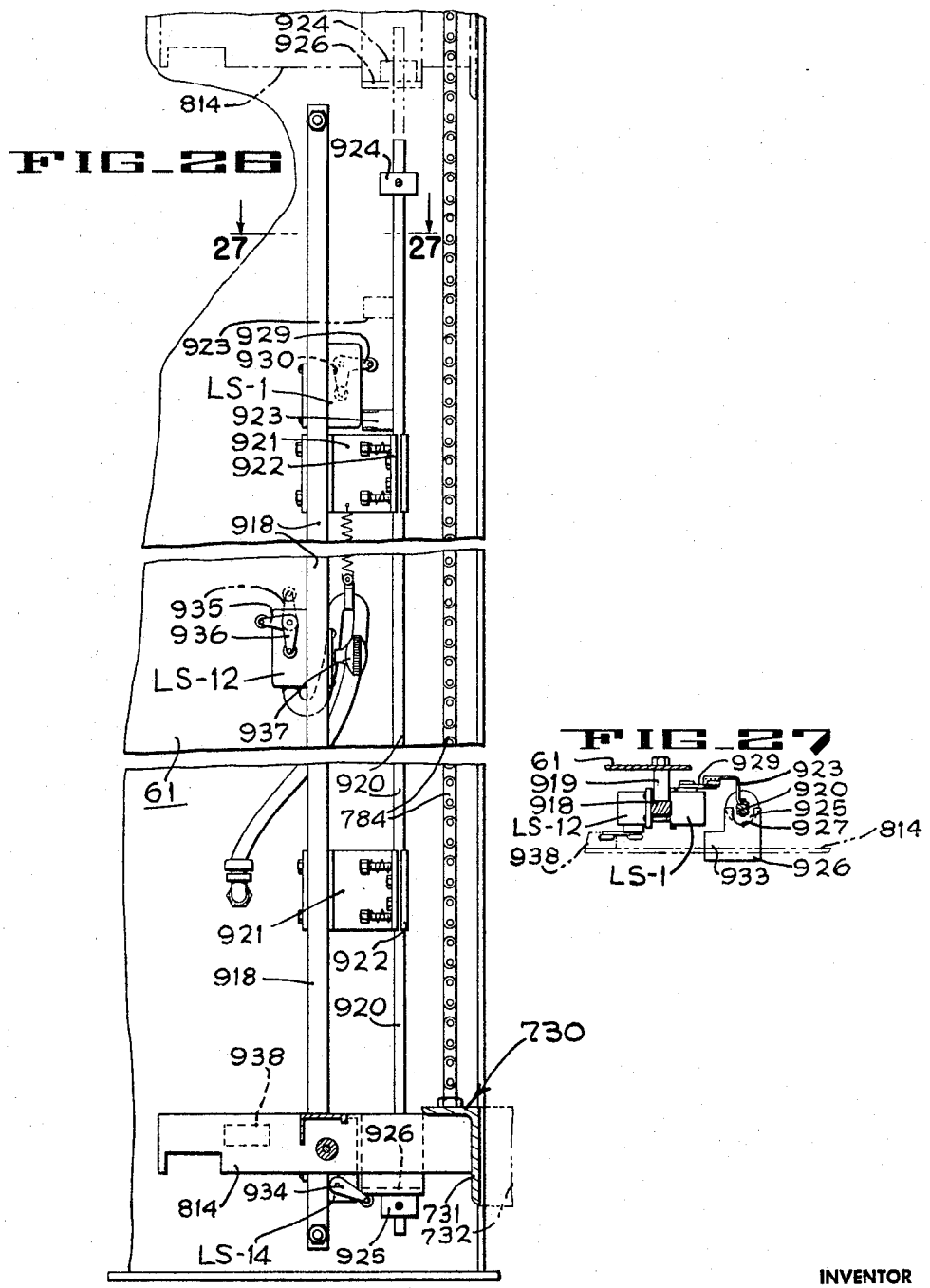
INVENTOR
ERNEST A. VERRINDER
BY Hans G. Hoffmeister
ATTORNEY

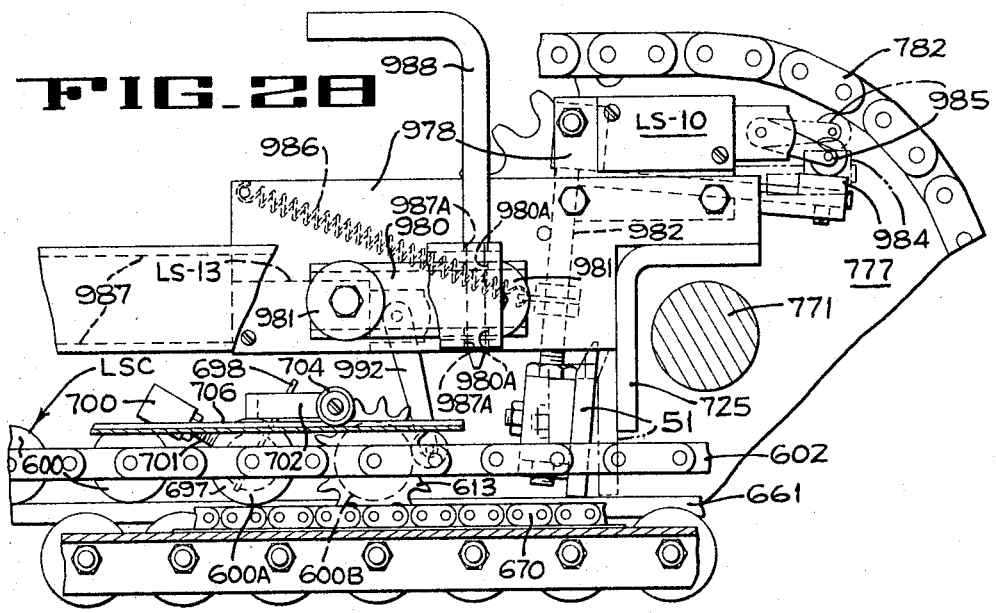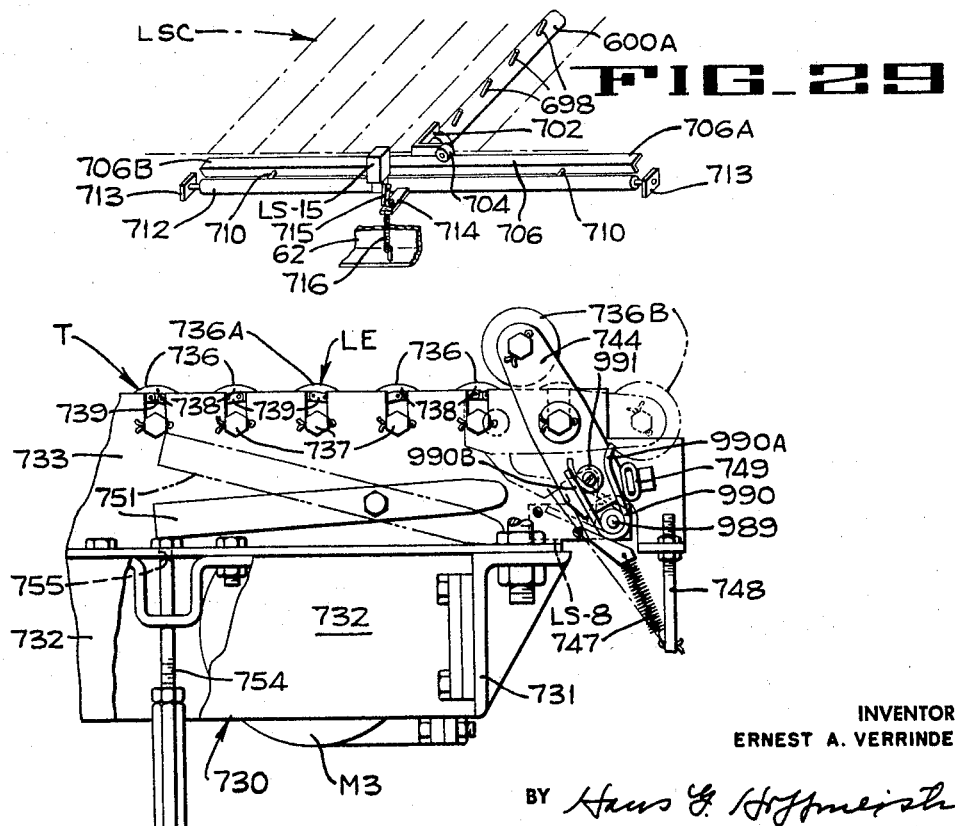

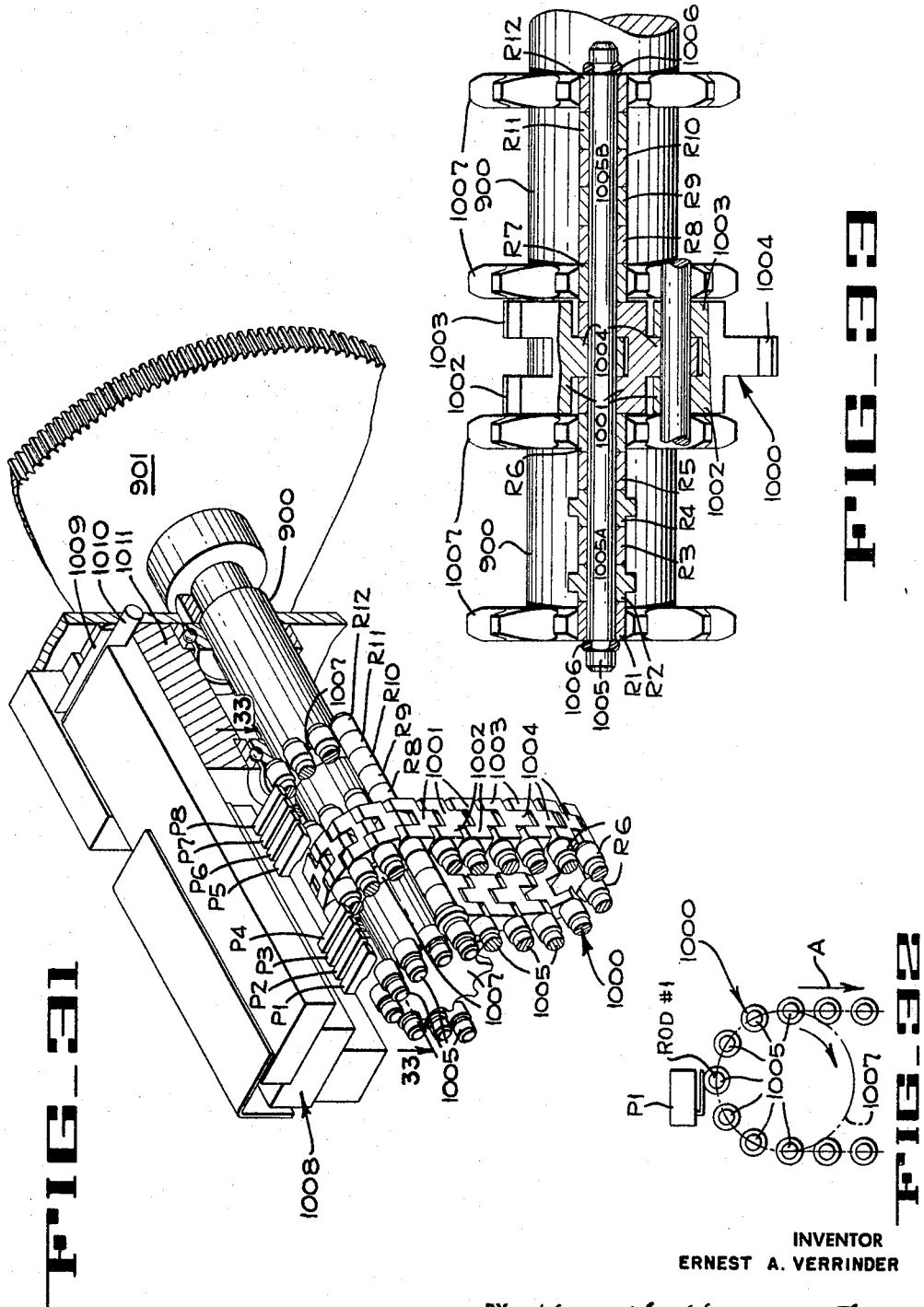

Aug. 2, 1966  E. A. VERRINDER  3,263,827
ARTICLE HANDLING APPARATUS
Filed Sept. 20, 1963  24 Sheets-Sheet 20
FIG_34
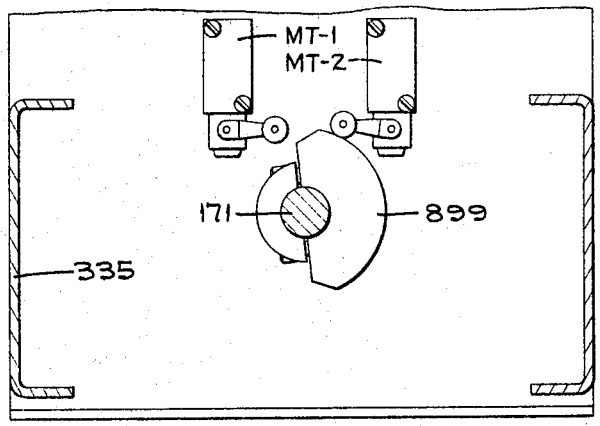
FIG_36        FIG_37
| CASE | ROLLER R2 P1 CASE TURN | ROLLER R3 P2 ROW DISCH. | ROLLER R4 P3 LAYER DISCH. | ROLLER R5 P4 GAP FORMER |
|---|---|---|---|---|
| ROD 1 | X | X | | |
| ROD 2 | X | | X | |
| ROD 3 | X | | | |
| ROD 4 | X | X | | |
| ROD 5 | X | | | |
| ROD 6 | X | | | |
| ROD 7 | | X | | |
| ROD 8 | | | | |
| ROD 9 | | | | X |
| ROD 10 | | | | |
| ROD 11 | | X | | |
| ROD 12 | | | X | |
| ROD 13 | | | | X |
| ROD 14 | | | | |
| ROD 15 | X | X | | |
| ROD 16 | X | | | |
| ROD 17 | X | | | |
| ROD 18 | X | X | | |
| ROD 19 | X | | | |
| ROD 20 | X | | | |
FIG_35
INVENTOR
ERNEST A. VERRINDER
BY *Hans G. Hoffmeister*
ATTORNEY

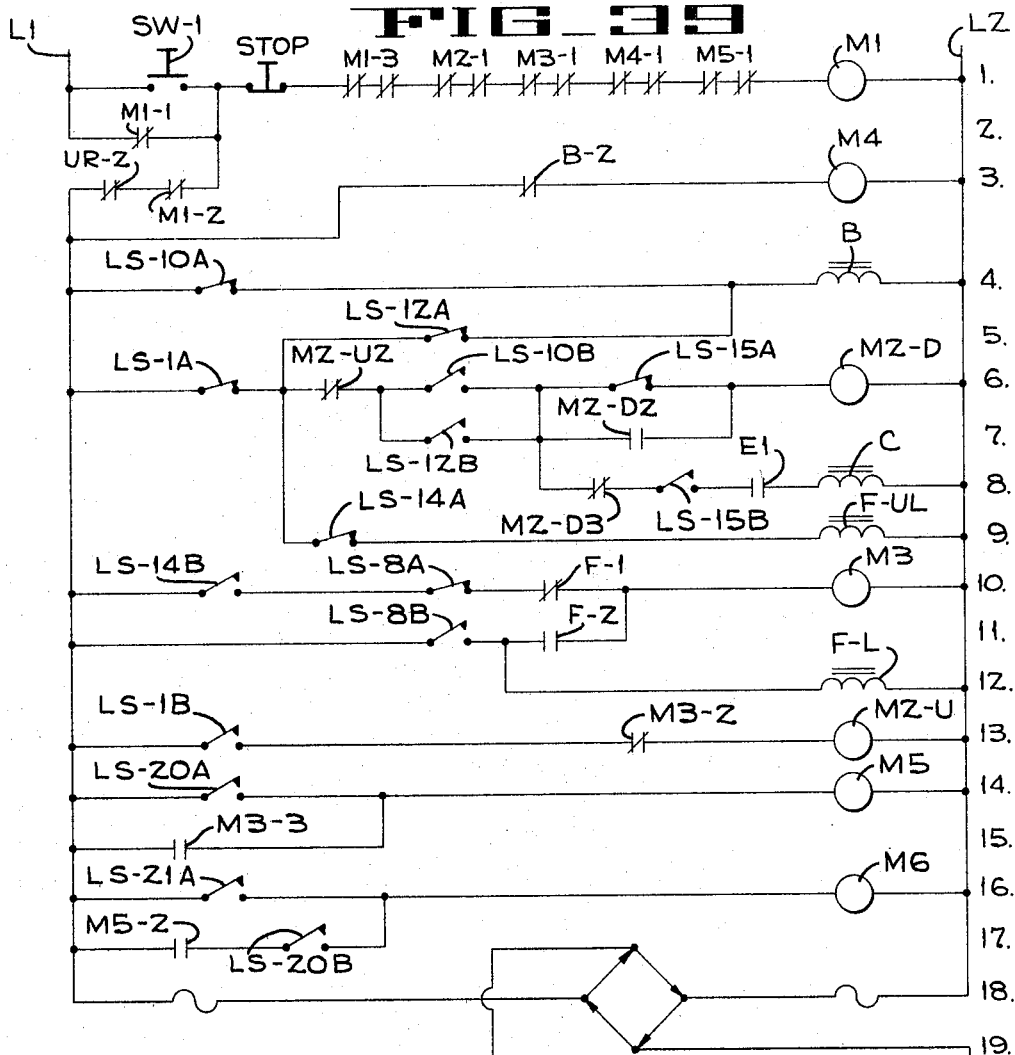
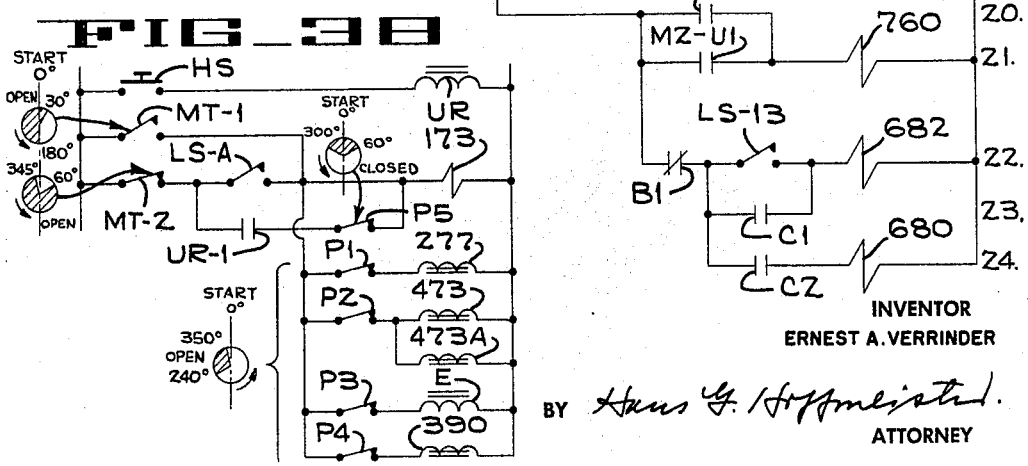

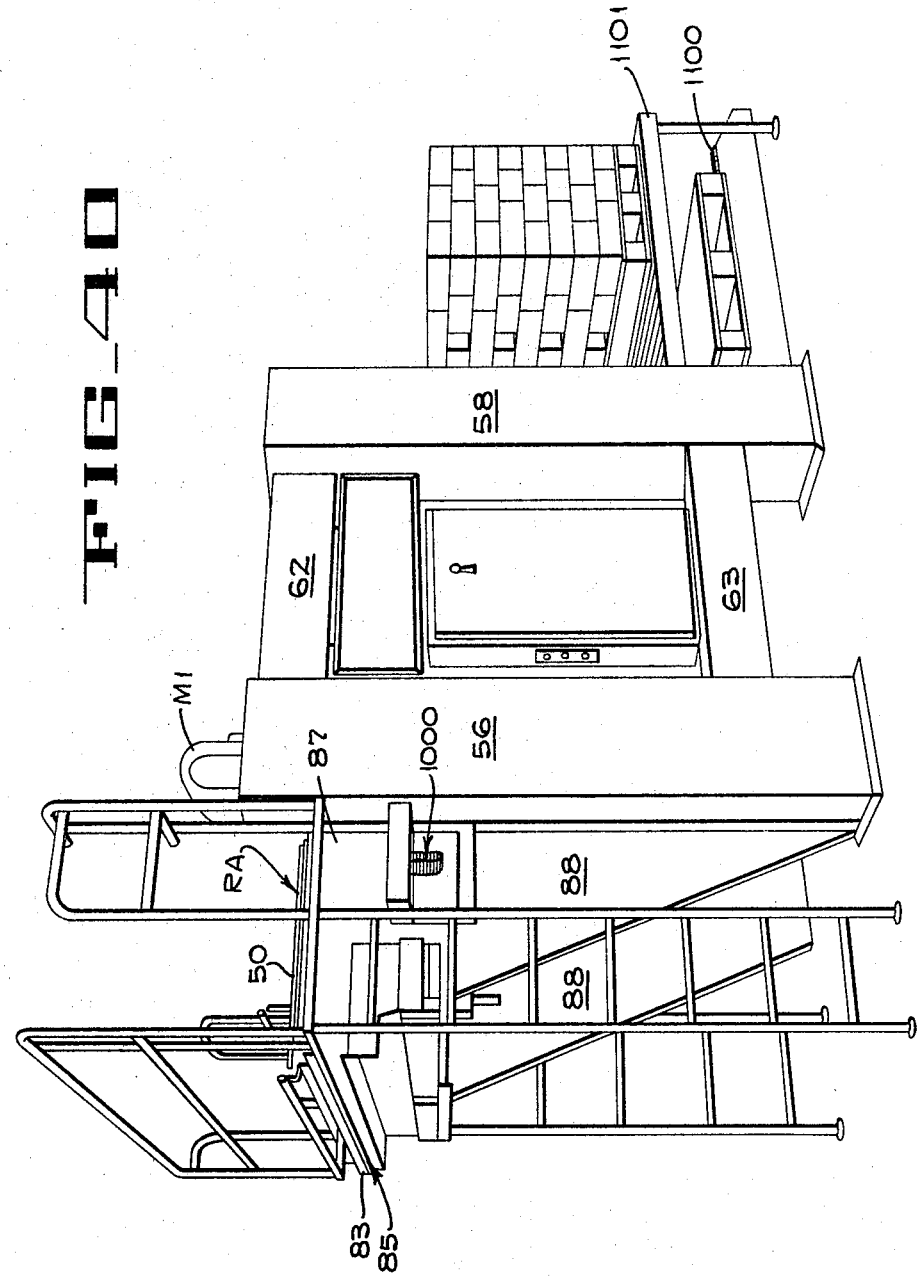

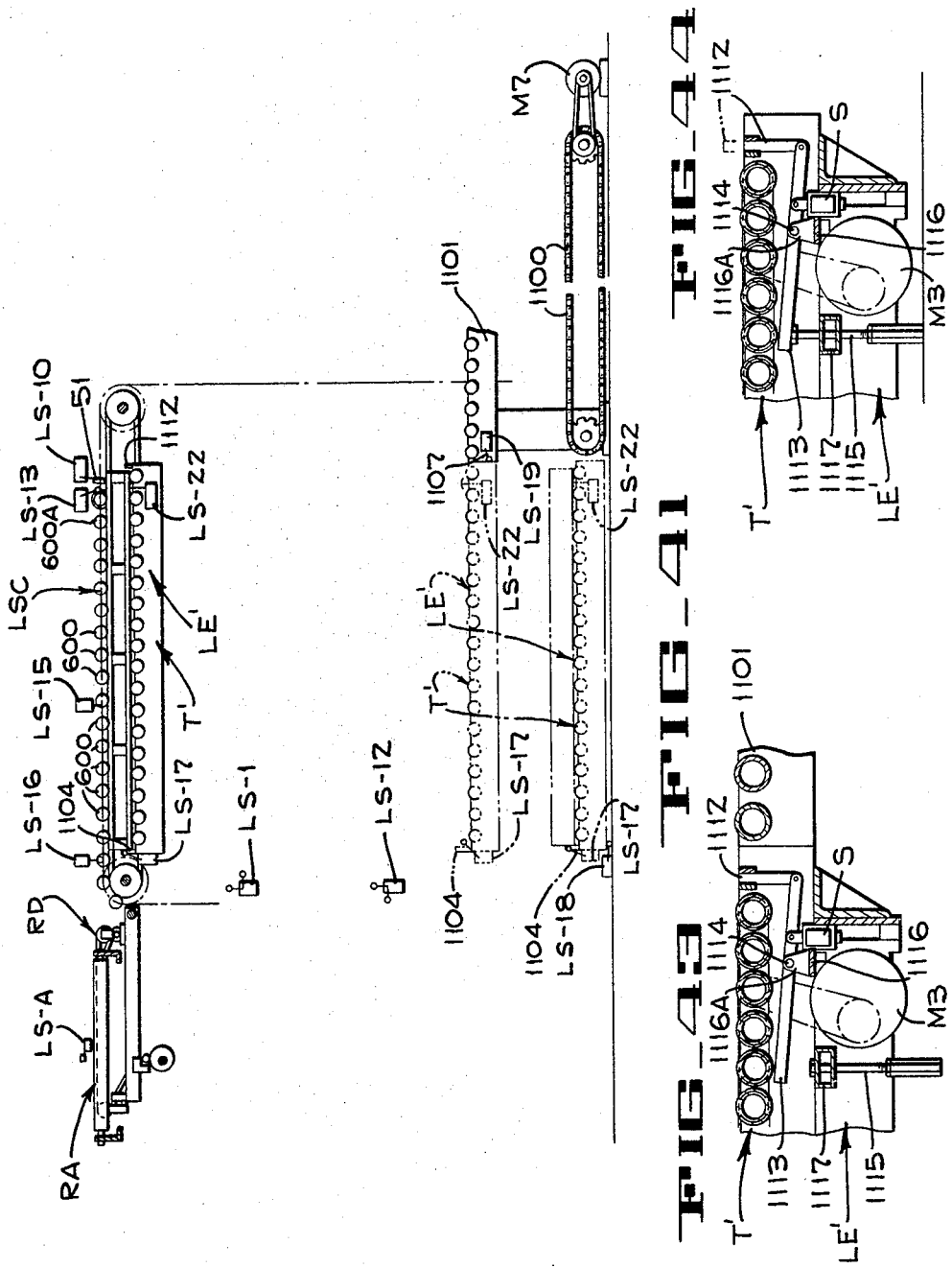

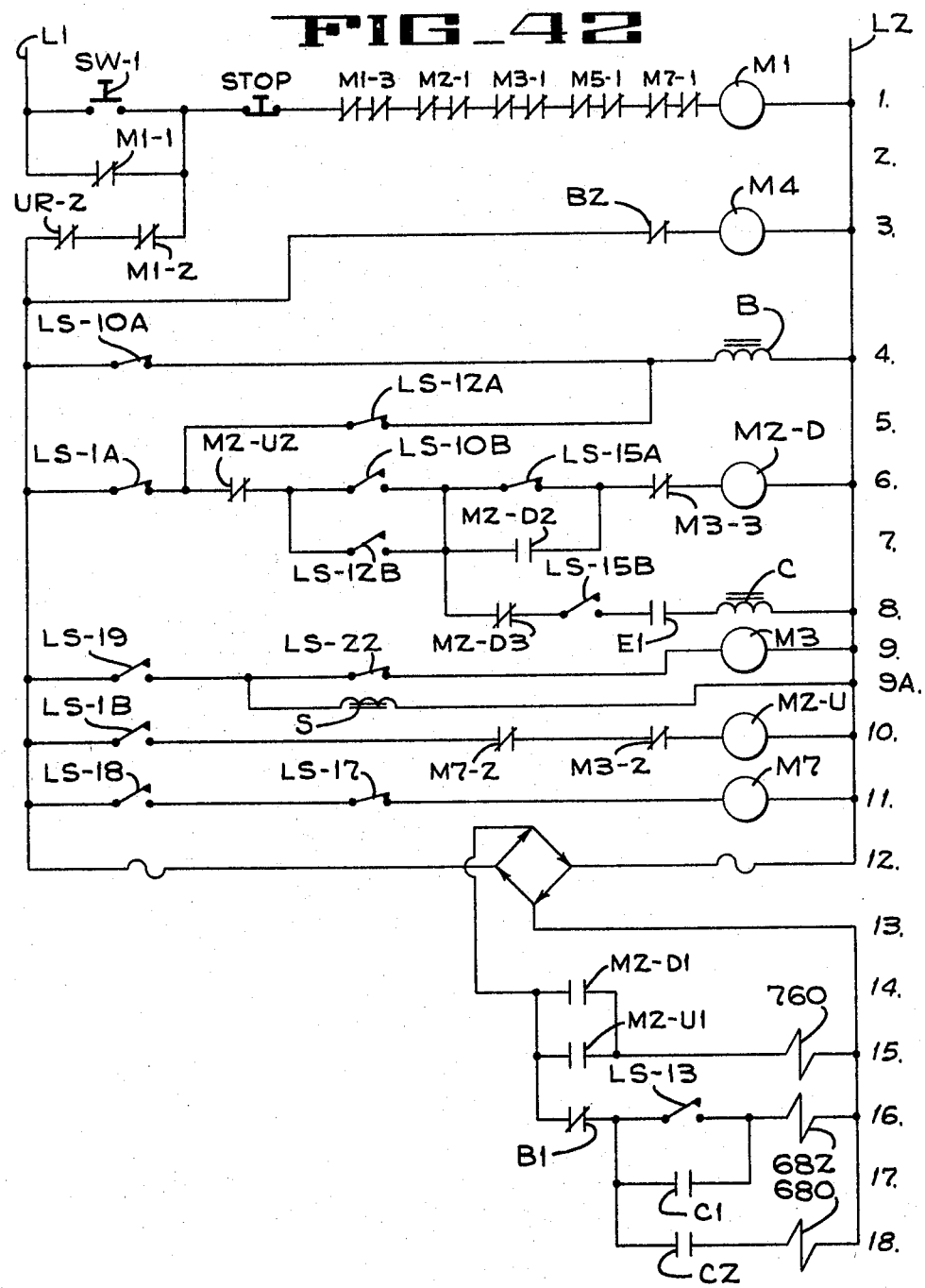

United States Patent Office 3,263,827
Patented August 2, 1966

3,263,827
ARTICLE HANDLING APPARATUS
Ernest A. Verrinder, Riverside, Calif., assignor to FMC Corporation, San Jose, Calif., a corporation of Delaware
Filed Sept. 20, 1963, Ser. No. 310,209
4 Claims. (Cl. 214—6)

This invention pertains to article handling apparatus, and more particularly to an improved arrangement of the mechanisms for handling empty and loaded pallets in a palletizing machine.

Palletizing machines have been provided heretofore for automatically placing articles on a pallet, discharging the loaded pallet, and positioning an empty pallet in article receiving position. Due to the many operations involved, these machines have been very large and require a considerable amount of floor space. In accordance with the teachings of the present invention, a palletizer is provided that is capable of automatically carrying out the usual palletizing operations but is compact in form and requires a minimum of floor space.

Accordingly, it is an object of the present invention to provide an improved palletizing machine.

Another object is to provide an efficient conveying system for the pallets being processed in a palletizing machine.

Another object is to provide a compact palletizing machine.

Another object is to provide an improved control circuit for a palletizing machine.

Other and further objects and advantages will be apparent from the following description taken in connection with the accompanying drawings, in which;

FIGURE 1 is a diagrammatic plan of the machine of the present invention.

FIGURE 2 is a diagrammatic perspective of the machine of FIG. 1.

FIGURE 3 is a fragmentary diagrammatic side elevation of the machine of FIG. 1.

FIGURE 4 is an enlarged fragmentary diagrammatic perspective of a portion of the machine of FIG. 1, the view being taken looking approximately in the direction indicated by arrows 4, 4 of FIG. 1.

FIGURE 5 is an enlarged fragmentary diagrammatic plan of the portion of the machine shown in FIG. 4.

FIGURE 6 is a diagrammatic vertical section taken on line 6—6 of FIGURE 5.

FIGURE 7 is a diagrammatic vertical section taken on line 7—7 of FIG. 5.

FIGURE 8 is an enlarged diagrammatic plan of the case turning mechanism of the machine of FIG. 1.

FIGURE 9 is a vertical section taken on line 9—9 of FIG. 8.

FIGURE 10 is a fragmentary vertical section taken on line 10—10 of FIG. 9.

FIGURE 11 is an enlarged elevation of a cam follower unit shown in FIG. 9.

FIGURE 12 is an enlarged diagrammatic perspective of a portion of the machine of FIG. 1.

FIGURE 13 is a diagrammatic vertical section taken on line 13—13 of FIG. 12.

FIGURE 14 is a fragmentary diagrammatic side elevation taken looking in the direction of arrows 14—14 of FIG. 13.

FIGURE 14A is an enlarged horizontal section taken on line 14A—14A of FIGURE 14.

FIGURE 15 is a fragmentary diagrammatic side elevation taken looking in the direction of arrows 15, 15 of FIG. 13.

FIGURE 16 is a fragmentary diagrammatic plan of the portion of the machine shown in FIGURE 12.

FIGURE 17 is a vertical section taken on line 17—17 of FIG. 16.

FIGURE 18 is a fragmentary diagrammatic plan of the layer stripping zone of the machine.

FIGURE 19 is a fragmentary diagrammatic vertical section taken on line 19—19 of FIGURE 18.

FIGURE 20 is an enlarged, diagrammatic horizontal section taken on line 20—20 of FIG. 19.

FIGURE 21 is a fragmentary vertical section taken on line 21—21 of FIG. 19.

FIGURE 22 is a fragmentary horizontal section taken on line 22—22 of FIG. 19.

FIGURE 23 is an enlarged vertical section taken on line 23—23 of FIG. 22.

FIGURE 24 is an enlarged vertical section taken on line 24—24 of FIG. 22.

FIGURE 25 is a diagrammatic perspective of a portion of the drive mechanism of the machine of FIG. 1.

FIGURE 26 is an enlarged, vertical section taken substantially on line 26—26 of FIG. 1.

FIGURE 27 is a horizontal section taken on line 27—27 of FIG. 26.

FIGURE 28 is an enlarged fragmentary vertical section taken substantially on line 28—28 of FIG. 18.

FIGURE 29 is a schematic perspective of one of the electrical control switches used in the present machine.

FIGURE 30 is an enlarged fragmentary vertical section taken substantialy on line 30—30 of FIGURE 21.

FIGURE 31 is a fragmentary diagrammatic perspective of a program chain used in the present machine.

FIGURE 32 is a schematic end elevation of the program chain of FIG. 31.

FIGURE 33 is a generally horizontal section taken substantially on line 33—33 of FIG. 31.

FIGURE 34 is a vertical section taken through the portion of the machine indicated by line 34—34 of FIG. 25.

FIGURE 35 is a chart showing control settings of the program chain for carrying out a predetermined sequence of layer forming steps.

FIGURES 36 and 37 are schematic plans of a first and a second layer of cases, respectively, of a typical pallet load of cases.

FIGURE 38 is a circuit diagram for the switches of the program chain.

FIGURE 39 is a circuit diagram for a portion of the electric control circuit of the machine.

FIGURE 40 is a diagrammatic perspective of a second embodiment of the pallet loader of the present invention.

FIGURE 41 is a fragmentary diagrammatic side elevation of the machine of FIG. 40.

FIGURE 42 is a control diagram for the machine of FIG. 40.

FIGURES 43 and 44 are enlarged fragmentary diagrammatic side elevations of two operating positions of a stop actuating mechanism.

The embodiment of the pallet loader chosen for illustration in FIGURES 1 and 2 comprises a case feed conveyor FC arranged to deliver articles such as cases, one-by-one to a case diverter CD which in cooperation with a case pusher CP, moves each case laterally onto a case turner conveyor CT. In order to form a stable layer of cases, certain of the cases must be turned, while passing over case turner CT, to a position oriented at right angles to the orientation they had on feed conveyor FC. In FIG. 1 it will be seen that cases C1–C9 have been turned 90 degrees while cases C10–C13 have their original orientation. After leaving the case turner, the cases are assembled in a row on a row accumulator conveyor RA, the leading case being in abutting contact with a rotatable stop roller 50 mounted at a fixed position on the conveyor RA. When a row of cases has been assembled, it is raised off the row accumulator RA and conveyed onto a layer accumulator and stripper carriage LSC by a row diverter conveyor RD which has elevatable conveying elements disposed between the rollers of the row accumulator RA. A layer of cases, made up of several rows, is assembled on the layer stripper carriage LSC, the leading row of the layer being in abutting contact with a stop bar 51 that extends across the forward end of the stripper carriage.

The stripper carriage is in the form of a flexible chain made up of elongate rollers and is arranged to move between a generally horizontal, layer-receiving position shown in full lines in FIG. 3 and a generally vertical, retracted position indicated by phantom reference line 52. After a layer of cases has been assembled on the stripper carriage, the carriage is moved toward the retracted position, causing the layer of cases to be deposited on a pallet P that is resting on a load elevator LE which is, at that time, in the upper phantom line position of FIG. 3.

After each layer of cases is stripped from the stripper carriage LSC, the load elevator is lowered a distance equal to the height of the layer so that another pallet can be positioned thereon. When a load consisting of the desired number of layers of cases has been formed on a pallet, the elevator is lowered to the full line position of FIG. 3 in alignment with a discharge conveyor DC. Power driven rollers which make up the support surface of the load elevator, are then actuated to convey the loaded pallet in the direction of arrow B onto the discharge conveyor DC.

While the loaded pallet is being moved off the pallet elevator, an empty pallet P' is being moved onto the elevator by pallet supply conveyors 53 and 54. When an empty pallet is on the elevator, the elevator is raised to lift the empty pallet and position it at the upper phantom line position immediately below the stripper carriage.

In general, the support structure of the palletizer may be constructed of conventional rigid structural members secured together to form a rigid frame adapted to support the several mechanisms of the machine. In the present embodiment the structure comprises a plurality of vertical members 56, 58, 59 and 61 which are of box-like construction in that they are made up of vertical plates welded together. These vertical members, which will be referred to as hollow support posts, are interconnected by horizontal box-like members, such as members 62, 63, 64 and 65 (FIG. 2) which will be referred to as box beams.

The feed conveyor FC (FIGS. 2 and 4) is an endless belt conveyor and includes a belt 66 that is trained around a drive roller 67 and an idler roller 68, both rollers being supported in spaced side members 69 and 70 that are mounted on fixed support members 71 and 72 projecting from posts 61 and 59, respectively. The drive roller 67 is keyed to a shaft 73 which may be driven in any suitable manner, as by a motor M4 (FIG. 1). It will be understood that this feed conveyor may be part of a preceding case-processing machine and may be driven by the drive mechanism of that machine and of course, it may be supported by separate support structure. The belt 66 is made of a material, such as a rubber composition, suitable for supporting and advancing the particular type of case being palletized.

The case diverter conveyor CD comprises a plurality of parallel rollers 80 (FIGS. 1 and 4), each roller being a hollow type that has a bearing unit pressed in each end. A shaft 81 extends through the tube and through the bearing units and has end portions of hexagonal cross-section projecting from the tube to be received between upright spaced walls defining a groove 82 in the opposite side walls 83 and 84 of a box-like frame 85 that has spaced end walls 86 and 87 (FIG. 1). This frame is supported from the support structure of the machine by suitable members including a plurality of triangular plates 88. The frame 85 encloses the case diverter CD, the case turner CT, the row accumulator RA, and the rod diverter RD. Thus, the eight rollers 80 of diverter CD provide a conveying surface which, when energized, will convey any cases supported thereon in a direction at right angles to the direction in which they enter the machine on feed conveyor FC.

The rollers 80 are rotated by the upper runs of two rubber belts 90 and 91 (FIG. 4), which contact the underside of each roller in frictional driving engagement. At one end, each belt is trained around a drive pulley 92 (FIG. 1) that is keyed to a shaft 93 which is rotatably mounted in brackets 94 mounted on end wall 87 of frame 85. At its opposite end (FIG. 5), each belt is trained around a pulley 96 that is keyed to a shaft 97 which is rotatably journalled in bearing units 98 carried by two brackets 99 that project inwardly from the wall 86 of the frame 85.

The cases are moved from the feed conveyor belt 66 to a position above the rollers 80 by means of a plurality of relatively thin V-belts 100 (FIG. 4). Each belt is disposed between two adjacent rollers 80 and, at one end, is trained around a grooved drive pulley 102 and at the other end around a grooved idler pulley 103. Each drive pulley 102 is keyed to a hexagonal shaft 105 that is supported for rotation in three spaced bearings 106, 107 and 108 (FIG. 5) which are mounted on and project upwardly from an inverted channel 109 (FIG. 4) that extends across the discharge end of feed belt 66 adjacent to and below the drive shaft 73. At each end the channel 109 is welded to the upper surfaces of two spaced channel beams 110 which are parallel to the belts 100 and are also secured together by an end channel 112 and by a central channel 115. It will therefore be noted that the two spaced channel beams 110 and the interconnected transverse channel members 109, 112 and 115 make up a rigid pivot frame 116 and, as seen in FIG. 4, this frame includes two upstanding plates 118 which are pivotally mounted on a transverse shaft 120. At each of its ends the shaft 120 extends through a boss 122 welded to the plate 118 and a similar boss 123 (FIG. 5) welded to the adjacent structural member 70 or 69.

The idler pulley 103 at the downstream end of each of the V-belts 100 is rotatably mounted in opposed walls at the upper end of a bracket 132 (FIGS. 4 and 6). The bracket is pivotally mounted at 133 in a block 134 which is carried by one end of a bolt 135 that is locked by nuts in the channel 112. Each bracket is urged in a counterclockwise direction (FIG. 6) around pivot point 133 by a spring 140 which is disposed between a nut on a bolt 141 and the channel 112. The bolt 141 passes through openings in the channel 112 and in the bracket 132. Thus, the spring 140 acts as a belt tightener, causing the upper run of the associated belt to be taut and causing the lower run to engage a guide roller 145 that is rotatably mounted on the central channel 115. The lower runs of the belts 100 also ride over the surface of a transverse roller 146 (FIG. 4) which is rotatably mounted in upstanding arms 148 of angle brackets 159 whose lower ends are welded to the longitudinal beams 110. Further, the upper run of each belt travels in a guide trough 161 (FIG. 6) which has a generally H-shaped cross-section and is supported by brackets 162 projecting upwardly from the channel 112 and from the central channel 115.

The V-belt drive shaft 105 is driven from the feed conveyor drive shaft 73 by means of a sprocket and chain drive 163 (FIG. 6).

The frame 116 on which the V-belts are mounted is raised and lowered under the control of a cam 170 (FIG. 6) that is keyed to a camshaft 171 and is in contact with a roller follower 172. The follower 172 is rotatably carried on the lower end of a rigid post 174 which is secured to and projects downwardly from a cross beam 175 of the frame 116. As will be explained presently, the camshaft 171 is rotated one complete revolution, by means of a one-revolution electrically operated clutch 173 (FIG. 6) each time a case moves over the belts 100. The clutch may be a Hilliad intermittent drive unit with a positive stop. When the camshaft 171 is stationary, the frame 116 is held in a raised position wherein the upper runs of the V-belts are at a level above the lever of the upper surfaces of the roller 80. Accordingly, each case leaving the discharge end of the feed conveyor belt 66 passes onto the elevated belts and moves to a position above the rollers 80. As it moves toward the wall 83 (FIG. 5) the case engages an actuator 178 of a switch LS-A causing a control operation which results in one revolution of the camshaft 171. As the camshaft rotates, the frame 116 is permitted to lower until the upper runs of the V-belts are below the surfaces of the rollers 80 and the case is resting on these rollers. At this time the rollers 80 are being rotated counterclockwise (FIG. 4) and the case is accordingly, conveyed toward the case turner CT.

When cases are advanced on the V-belts 100 at a rate of about 50 cases per minute, the rollers 80 will effectively divert the cases when the cases are deposited thereon. At higher speeds, the cases tend to overtravel as they are deposited on the rollers. To arrest the movement of these high speed cases, a case pusher CP (FIG. 5) is provided which includes a rectangular pusher frame 180 which has four rollers 181 riding in tracks provided by two spaced upwardly-opening channels 182. One leg of an angle bar 183 overlies each channel to prevent upward movement of the rollers in the channel, and each angle bar and each channel is secured to a rigid support bar 184 that extends between the walls 83 and 84. Cases are guided to a position in front of the pusher frame 180 by a guide bar 185 which extends to a point above the discharge end of feed conveyor belt 66. The frame 180 is reciprocated back and forth by means of a crank disk 186 (FIG. 7) which is keyed to the output shaft of a gear box 187 and pivotally mounts one end of a push rod 190 that is secured, at its other end, to the rear member of frame 180.

The input shaft of the gear box 187 is driven by a chain 194 that is trained over a sprocket 195 (FIG. 7) keyed to a jack shaft 196 which, in turn, is driven by chain 197 from one take-off shaft 198 of a gear box 199. The gear box 199 has a second power take-off shaft 200 and an input shaft 201 (FIG. 7) which is driven through a chain and sprocket drive 203 by a power driven shaft 202 which extends longitudinally of and is disposed below the frame. The chain and sprocket drive 203 also drives the drive element of a one-revolution clutch 173 which, when engaged, rotates the camshaft 171 through one complete revolution.

The second take-off shaft 200 of gear box 199 drives the drive shaft 97 (FIG. 6) which drives the belts 90 and 91 that underlie and frictionally drive the rollers 80 of the case diverter conveyor CD.

The case turner CT (FIGS. 1, 8, and 9) comprises two sets 220 and 221 of identical rollers 222. As will be explained more fully presently, when a case is to be turned through 90°, the rollers of set 221 are stopped to create a frictional drag on the undersurface of the case while the rollers of set 220 continue driving and cause the case to pivot using the stationary rollers as a fulcrum. Accordingly, the rollers of set 220 will be called turning rollers, and the rollers of set 221 will be called control rollers. Each roller 222 consists of a tube 223 having a bearing 224 pressed in each end, and a shaft 225 that extends through the bearings and through the tube and has end portions of hexagonal cross-section. Each of the rollers of set 220 has one end disposed in a vertical slot 228 in the wall 83 of the box frame 85 and its opposite end disposed in an aperture 229 (FIG. 9) in one of two angle support members 230 that are secured to and project upwardly from a cross brace 231 which together with a cross brace 232 rigidly connect the walls 83 and 84 of frame 85.

The belts 90 and 91, which drive the rollers 80 of the case diverter CD, also engage the bottom surface of rollers 222, belt 90 engaging the rollers of set 220 and belt 91 engaging the rollers of set 221. The rollers of set 220 are continuously driven by belt 90, but the rollers of set 221 are arranged to be selectively lifted out of engagement with their driving belt 91 by a lever 240 (FIG. 9) which includes a generally, square, rigid frame member (FIG. 8) made up of side members 241A, 241B, 241C, and 241D. A lifter bar 243 is secured by bolts 244 to the side member 241B, and a contact plate 245 is secured by capscrews 246 to bar 243. A facing strip 247 of relatively yieldable material such as cork, is secured as by an adhesive to the upper surface of plate 245.

The side members 241A and 241C of lever 240 are provided with hubs 249 which rotatably receive a shaft 250 (FIG. 8) that is secured between two fixed posts 251 and 252 (FIG. 8), the post 251 projecting upwardly from the fixed cross brace 232 and the post 252 projecting upwardly from the fixed cross brace 231. A U-shaped lifting arm 260 (FIG. 10) has opposite members 260A and 260B welded to the side members 241A and 241C, respectively, and a link 261 is secured to and projects downwardly from the base of U-shaped arm 260 to support a selectively activated cam follower unit 262 (FIG. 9) which includes a cam follower roller 263 that rides along the surface of a cam 264 keyed to camshaft 171. The unit 262 includes a mounting block 266 which is bolted to the link 261 and pivotally supports a lever 267 on which the follower 263 is rotatably mounted. A latching lever 270 is also pivotally supported on block 266, being movable from the lowered position, shown in full lines in FIG. 11, to the upper, phantom line position on FIG. 11 wherein its flat end face 270A is opposite a flat side surface 267A of the follower support lever 267. The latching lever 270 is normally urged to its lowered position by a compression spring 272 which is positioned in an elongate recess 273 in the block 266 and engages a short push rod 274 that bears against the latching lever. A solenoid 277, which is mounted on block 266, has its armature connected to the latching lever by a spring 278 so that, when the solenoid is energized, the lever will be pivoted upwardly to position its end face 270A opposite the side face of lever 267. Then, the next time the cam 264 urges the lever 267 in a counterclockwise direction, the follower 263, the latching lever and the block 266 will act as a rigid member and cause the box-type lever 240 to swing counterclockwise about shaft 250 to raise the lifter bar 245 (FIG. 9) and the facing strip thereon into contact with the undersurface of the rollers 222 of roller set 221. Accordingly, each roller is raised out of engagement with the drive belt 91 and into engagement with a brake member in the form of a plurality of bolts 280, each of the bolts 280 being secured in an angle bar 281 which is secured to the support post 61.

Referring to FIG. 1, it will now be evident that the rollers of roller sets 220 and 221 of the case turner CT are continuously driven by the underlying drive belts. Accordingly, cases that are diverted by the case diverter CD and case pusher CP are carried sidewise over the rollers of the case turner and onto the row accumulator section RA. However, if a case is to be turned so that it will have a new orientation, the solenoid 277 is actuated to raise roller set 221 away from the drive belt 91 and against the positive brake member 280. As the rollers of set 220 continue to advance the package, the stationary rollers of set 221, frictionally grip the underside of the case, causing it to pivot counterclockwise (FIG. 1) to its new oriented position.

A particular feature of the case turner CT is illustrated in FIG. 9 wherein it will be noted that the axes of the rollers 222 of each set of rollers are inclined downwardly and inwardly so that only the side edges of the bottom of a case C, indicated by phantom lines, engages the rollers. Since the lower surfaces of many cases are uneven, difficulty was experienced in effecting a reliable frictional gripping engagement between said lower case surfaces and stationary control rollers when the rollers are horizontal. With the inclined arrangement of FIG. 9 the edge of the cases provides contact surface which effects a reliable uniform engagement with the cases and makes it possible to accurately coordinate the number of rollers, the size of the rollers, and the surface material of the rollers so that a wide range of cases can be effectively turned. Also, it will be evident that the inclined disposition of the rollers results in an automatic centering action on cases that are being conveyed over the rollers without being turned.

The row accumulator RA (FIGS. 1 and 12) comprises a plurality of rollers 300 which are identical to the rollers 222 in design. Each roller 300 has one hexagonal end portion disposed in a vertical slot 301 (FIG. 12) in side wall 83 and the other end portion in a vertical slot 302 in the wall 84. The previously mentioned stop roller 50 is secured to two spaced upstanding plates 304 and 305 (FIG. 12), plate 304 having two vertical spaced pins 306 disposed in one of the slots 301 and plate 305 having two identical pins 307 disposed in the opposite slot 302. Since the pins on the ends of the plates 304 and 305 are slidably disposed in the associated slots, it is evident that the roller 50 can be operatively disposed in any pair of aligned slots 301, and 302 in the walls 83 and 84 so that the point at which the leading box of each row is stopped can be varied merely by removing one of the rollers 300 and replacing it with the roller 50. Accordingly, the replaceable roller 50 provides means for accurately locating the side edge of the layer of articles of each pattern so that the position of the layer and the position of the pallet onto which it is to be deposited can be coordinated.

Referring to FIG. 1 it will be noted that in the formation of a typical layer of cases, the first three rows of cases, including cases C1–C9 were turned 90° on the case turner CT while the fourth row of cases including cases C10–C13 were assembled in their original orientation on the row accumulator RA. In order that the trailing edge of case C13 be in alignment with the trailing edges of cases C3, C6, and C9, it is necessary to provide a gap between certain cases of the fourth row of cases as it is formed on the row accumulator. While the gap could be formed between cases C10 and C11, or between cases C12 and C13, in the present example the gap is formed between cases C11 and C12 and this is accomplished by means of an elevating mechanism 310 which is effective to engage the end of a particular roller 300A adjacent side wall 83 and swing said end upwardly, causing the roller to pivot about its opposite end. As a result, a substantial portion of the roller 300A is disposed in the path of movement of case C12 after case C11 has already passed over said roller.

The elevating mechanism 310 comprises a threaded push rod 320 (FIGS. 13 and 14) that has yokes 321 and 322 adjustably threaded on its upper and lower ends, respectively. The upper yoke 321 carries a transverse pin 323 which passes through an opening in the hexagonal end of roller 300A to pivotally connect the roller to the push rod. The lower yoke 322 carries a pin 328 which extends through a slot 329A in one end of a lever 329 to pivotally connect the lever to the push rod. The lever 329 is pivoted at its opposite end on the lower end of a bar 331 which is secured to and projects downwardly from an angle plate 333 that is supported by two channel members 334 and 335 which are part of the structure that connects the frame 85 to the main support structure of the machine.

The push rod 320 is urged upwardly by a spring 340 which is connected between a collar 342 secured to the push rod and a support frame 343 mounted on and projecting upwardly from the side wall 83. A spring 345 is connected between a second collar 346 on the push rod 320 and the outermost end of lever 329. The push rod 320 is movable between the lowered position illustrated in FIG. 14 and an elevated position wherein the axis of roller 300A is in the position indicated by phantom line 350, and it is normally held in lowered position by a horizontal plate 352 that is mounted on a channel 353 which is part of a vertically movable belt carrying frame 354 to be described presently. The plate 352 overlies a block 355 which has a lowered end portion adjustably threaded into the upper end of a latching lever 356. The latching lever is pivotally mounted at its lower end on the lever 329 by means of a shoulder screw 357. A tension spring 360, that is connected to the latching lever and to a fixed post 362 which is secured to and projects upwardly from the angle plate 333, urges the latching lever 356 in a clockwise direction about screw 357 until the lever abuts a capscrew 364 that is threaded in the fixed bar 331. A second latching lever 365 is pivotally mounted on screw 357 and is disposed in side by side relations with lever 356. The lever 365 is shorter than lever 356 and has an upper end surface underlying an arm 366 formed on a plate 368 secured to the post 362.

The longer latching lever 356 is moved from its latched position under the horizontal plate 352 by a push rod 370 which has one end slidably disposed in an opening in the post 362 and has a yoke 371 at its opposite end that is pivotally connected to a cam follower lever 372. The lever 372 is pivotally mounted by means of a shoulder screw 373 on a bracket 374 which is welded to the angle plate 333. A latch lever 378 is pivoted at 379 on an upstanding leg 333A of angle plate 333, and has a recess 380 at one end which receives a shoulder screw 381 carried by the follower lever 372 to prevent counterclockwise pivotal movement of lever 372. A spring 385 is connected between the latch lever 378 and the fixed bracket 374 to urge the lever 378 in a counterclockwise direction into latching engagement with shoulder screw 381. A solenoid 390, which is mounted on the angle plate 333 has its armature connected by a spring 391 to the latch lever 378 and, accordingly, when the solenoid is energized, the lever 378 will be pulled in a clockwise direction and will release the shoulder screw 381, permitting the follower lever 372 to rotate counterclockwise about screw 373 under the urging of a spring 395 connected between the upper end of lever 372 and the post 362. The follower lever 372 will not actually swing counterclockwise, however, until a cam 396 on the camshaft 171 permits a roller 397 on the lower end of the lever to ride down an inclined portion of the camming surface along which it rolls.

When the cam 396 does permit the follower lever 372 to swing counterclockwise, the push rod 370 engages the latching lever 356 and pivots it counterclockwise out of latched engagements with the plate 352. A laterally projecting arm 397 carried by the long lever 356 engages the short lever 365 and moves it out of engagement with the latch arm 366. As soon as this dual unlatching action is completed, the spring 340 draws the push rod 320 upwardly to raise the associated roller 300A into the path of a case being advanced on the rollers 300. A stud 399 is mounted on angle plate 333 in the path of upward movement of lever 329, the contact of lever 329 with stud 399 being effective to limit the upward movement of the push rod 320.

The support frame 343 (FIG. 13) in which the upper end of spring 340 is anchored, comprising two spaced vertical rigid straps 400 and 401 each of which is disposed inwardly of the side wall 83 of frame 85 and is of stepped configuration in cross-section (FIG. 14A) having a portion 402 disposed in one of a plurality of cutouts 403 (FIG. 14A) formed in the wall 83. A lock plate 404 (FIG. 13) is disposed on the outer side of wall 83, opposite each strap 400 and 401 and capscrews 405

(FIG. 13) secure the straps 400 and 401 to the plates 404, locking the frame 343 in position on the wall. A spacer block 406 is secured by the capscrews 405 to the inward side of each strap 400 and 401 and a piece of belting 407 is secured to the block 406 that is connected to strap 400. A fragmentary cylindrical recess 412 (FIG. 13) is formed in one side edge of the belting to receive and retain the roller 300A when it is in raised position.

After a complete row of cases have been formed on the row accumulator, the belt carrier frame 354 is swung upwardly to lift the cases off the rollers 300 and convey them onto the layer accumulator and stripper carriage LSC, as previously mentioned. During this upward movement of the frame 354, the plate 352 (FIG. 14) is raised to a position higher than the upper end of the block 355 on latching lever 356. If at this time the solenoid 390 has been de-energized, the spring 385 and cam 396 will latch the lever 372 in the position of FIG. 14, permitting the spring 360 to pivot the long latching lever 356 clockwise against stop 364 to position block 355 below the elevated plate 352. Subsequent downward movement of the belt carrier frame 354 causes the plate 352 to engage the block 355 to move the lever 356 downwardly. Thus, the shoulder screw 357, the short lever 365 and the lever 329 are also moved downwardly. As soon as the upper end of the short lever 365 is below the level of the latch arm 366, a spring 361 will swing the lever clockwise to a position underlying latch arm 366 and abutting the arm 397 of the long latching lever 356. The case stop roller 300A is now in its lowered position, out of the path of cases advancing on the row accumulator conveyor.

Referring to FIGS. 12 and 16, it will be noted that a relatively thin conveyor belt 415 of the row diverter RD is mounted alongside each roller 300, the upper surface of each belt being arranged to travel from left to right in FIG. 16. Normally the upper surfaces of these belts 415 are below the level of the upper surfaces of the rollers so that the belts will not interfere with the formation of a row of cases on the row accumulator. When a row of cases has been assembled, the belts are pivoted about a pivot axis adjacent their right ends, causing the left side of each belt to be raised to lift the row of cases off the rollers 300 and convey them to the right (FIG. 16) to deliver them to the layer accumulator and stripper carriage LSC which is adjacent the right hand ends of the belts 415.

In order to accomplish the simultaneous upward movement of all of the belts 415, the belts are mounted on the support frame 354, which includes two side channel members 418 and 419, (FIG. 16) the channel 353, and two end members 420 and 421, all secured together to form a rigid unit. The end member 421 is a rigid tube that is welded to blocks 422 and 423 which are bolted to the side channels 418 and 419, respectively. The frame 354 is journalled for pivoting movement on two stub shafts in the form of shoulder screws 425 and 426, each screw having a head 427 disposed inside the associated channel 418 or 419, an unthreaded central portion that extends through the channel and pivotally supports a bearing 431 which is bolted to the outer side of the channel and a threaded end disposed in a tapped hub 428 or 429, said hubs being bolted to wall members of the vertical posts 61 and 56, respectively.

At one end, each belt 415 is trained around a drive pulley 435 which is keyed to a hexagonal shaft 436 that is journalled for rotation in bearings 437 and 438 carried by the side channels 418 and 419, and in a central bearing 439 that is mounted on the tubular member 421. At its opposite end, each belt is trained over a pulley 440 that is rotatable in opposed walls at the upper end of a bracket 445 which is pivotally mounted in spring-loaded position on the end member 353 of the support frame 354 in exactly the same manner in which the previously described brackets 132 (FIG. 6) are mounted. The lower run of each belt 415 rides over guide pulleys 446 and 447 (FIG. 17) and the upper run travels in an H-shaped guide trough 448 which is supported in brackets 449 and 450.

The frame 354 of the row diverter on which the V-belts 415 are mounted is pivoted upwardly about an axis defined by the aligned stub shafts 425 and 426 by means of two identical spaced cams 460 (one only being shown in FIG. 17) keyed to camshaft 171 which, as previously mentioned, is periodically rotated through one revolution by a one-revolution clutch. When the camshaft is stationary, the frame 354 rests on the fixed channel 335 and the upper surfaces of the belts are below the level of the upper surfaces of the case-supporting rollers 300. During rotation of the camshaft 171 the cam 460 engages a roller follower 465 which is part of a selectively actuated cam follower unit 466 that is identical to the previously described follower unit 262 but is oriented in a slightly different manner. The follower 465 is rotatably mounted on an arm 470 that is pivoted at 471 on a bracket 472 secured to channel 418. A solenoid 473 is arranged, when energized, to pivot a latching lever 474 clockwise about a pivot pin 475 against the resistance of a spring (not shown) to align the lower end face of lever 474 with a flat side face of the lever 470. When these faces are aligned, the lever 470 and lever 474 act as a solid member causing the frame 354 to be raised when the high part of cam 460 engages roller 465. A compression spring (not shown) urges the lever 470 downwardly to hold the roller 465 in engagement with cam 460. As seen in FIG. 16 there is a second lifter unit 466A that is identical to unit 466 and is connected to channel 419. Accordingly, there is also a second cam 460A on shaft 171 and a solenoid 473A in unit 466A.

The layer stripper carriage LSC comprises a plurality of rollers 600 (FIGS. 18 and 20) carried by two spaced chains 601 and 602. Each roller, except the leading rollers 600A and 600B (FIG. 20), includes a tubular outer member 607 having a bearing unit 608 pressed in each end. A pin 609, which is integrally formed as part of a link of the adjacent chain, has an end portion carried by the inner race of the adjacent bearing unit. Accordingly, as each roller is advanced by the chains, it is free to rotate about its axis which of course, coincides with the axis defined by the associated pins 609. Each roller has a cylindrical drive sleeve 610 fixedly secured, as by welding, on each of its ends. The leading roller 600B comprises a center shaft 611 having a recess which receives a pin 612 that is carried by the adjacent chain 601 or 602 and is rotatably mounted in a small ball bearing unit in the end of the roller. A sprocket 613 is keyed to one end portion of the shaft 611, and a roller bearing unit 614 is locked in position on shaft 611 adjacent sprocket 613 by a set collar 615. At the other end of shaft 611, a support roller 616 is held in position by set collars 617 and 618, alongside a spacer 619, that is smaller in diameter than the drive sleeves 610 of the rollers 600. The support roller 616 supports one end of the shaft 611 by its slidable engagement with the upper surface of an angle bar 622 (FIG. 21) which is secured to a vertical wall member 623 of support post 59.

At the entrance end of the layer stripping zone, the chains 601 and 602 are trained around sprockets 626 and 627, respectively, (FIG. 18) that are mounted on bearing units 628 and 629. The units 628 and 629 are disposed on a shaft 631 which is rotatably mounted in bearing assemblies 632 and 633 secured to a vertical wall of beam 65 and to a vertical wall of beam 62. At the downstream end of the layer stripping zone, the chains 601 and 602 are trained over sprockets 640 and 641, respectively, both of which are keyed to a shaft 642 that is rotatably journalled in bearings 643 and 644 carried by the vertical wall member 623 and a vertical wall member 645 of the support post 58, respectively. A torsion spring 650 is disposed on a sleeve 651 encircling shaft 642 and has one end 650A anchored in a fixed bracket 648 and the other end anchored in a circular plate 652 (FIG. 20) that is bolted to a plate 653 which is keyed at 654 to shaft 642. The spring is so arranged that it is effective to drive the shaft 642 clockwise (FIG. 19) tending to move the chains 601 and 602, and the rollers carried thereby, to the position indicated in FIG. 19 overlying the load elevator LE.

The rollers 600 of the stripper carriage are rotated by means of two belts 660 and 661 (FIG. 18) which are disposed on opposite sides of the layer stripping zone, the belt 660 being disposed below and in frictional engagement with the drive sleeves 610 at one end of the rollers and belt 661 being in frictional driving engagement with the sleeves 610 at the other end of the rollers. Each of the belts is trained around a pulley 664 (FIG. 20), which is mounted for free rotation on shaft 642, and around a pulley 665 (FIG. 21) that is keyed to shaft 631. As will be explained presently, during the layer stripping operation, the shaft 631 is arranged to be driven in a counterclockwise direction (FIG. 19) to move the upper run of the belts 660 and 661 in the direction of arrow 666.

The leading roller 600B (FIG. 18) is postively driven by an endless chain 670 that is trained around a sprocket 671 which is keyed to shaft 631 and around a sprocket 672 (FIG. 20) which is keyed to a short shaft 673 journalled in fixedly mounted bearings 674 and 675. A chain 676 is traied around a sprocket 677 on shaft 673 and around a sprocket 678 that is rotatably mounted on shaft 642 and is carried by the drive element 679 of a magnetic clutch 680. This clutch may be of the type that is commercially identified as Fawick Magnetic Clutch SC–550. The driven member 681 of the clutch is keyed to shaft 642. It will be evident that when the shaft 631 is rotated, the chain 670 will rotate the leading roller 600B and, if the magnetic clutch is energized at this time, the shaft 642 will also be driven. A magnetic brake 682 is connected to the shaft 642 by a chain and sprocket drive 683. The brake may be a Fawick Magnetic Brake SB–650 and is arranged to stop rotation of shaft 642 when it is de-energized.

The second roller 600A comprises a center shaft 690 having a roller bearing unit 692, at one end locked in place between set collars 693 and 694 that are secured to shaft 690, and a bearing unit 695 at the other end locked in place between set collars 696 and 697 that are also secured to shaft 690. A plurality of radially extending case-sensing fingers 698 are secured in the roller 600A to project radially outwardly from the surface of the roller. A weight 700 is adjustably mounted on a stud 701 projecting radially from set collar 693, and, at the opposite end of shaft 690, a bent support arm 702 is secured to the set collar 697. A roller 704 is rotatably mounted on the end of support arm 702 overlying an elongate angle plate 706 which extends along practically the entire length of the stripping zone, having a forward end 706A (FIG. 20) adjacent the shaft 642 and a rearward end 706B (FIG. 18) adjacent the shaft 631. The plate 706 is supported on a plurality of studs 710 (FIGS. 18, 20 and 21) which are adjustably secured to the plate and to a tube 712 that is rotatably journalled in mounting arms 173 projecting from a wall of box beam 62. As will be explained further hereinafter when the second roller 600A of the stripper carriage is rotated, due to the engagement of the fingers 698 by the leading row of cases being advanced onto the stripper carriage by the row diverter RD, the roller 704 on bent arm 702 engages the elongate angle plate 706 and pivots it clockwise (FIG. 21) to swing an actuator arm 714 (FIG. 18) which extends radially from the tube 712 into engagement with a switch arm 715 to actuate a switch LS–15 that is mounted on a side wall of box beam 62. A spring 716 (FIG. 29) which is connected to the actuator and to a horizontal wall member of beam 62, is stretched as the switch actuator arm 714 is swung upwardly. Subsequently when the cases are removed from the fingers 698, the spring swings the arm 714 counterclockwise (FIG. 29), causing the plate 706 to raise the roller 704 and the bent support arm 702, whereby the roller 600A is rotated counterclockwise to return the fingers 698 to generally upright, case-intercepting position.

Referring to FIG. 3, it will be noted that the rollers 600 and 600A are rotated clockwise to bring the layer of cases row by row into contact with the stop bar 51 which is part of a switch mechanism that will be described more fully presently. When the layer of cases has been assembled, continued clockwise rotation of the rollers causes the stripper carriage to walk out from under the cases due to the engagement of the rollers with the under surfaces of the cases. Accordingly, the cases are dropped, row by row onto the pallet therebelow.

Referring to FIG. 1, it will be noted that two guide bars 717 and 718 are disposed at the forward end of the machine. These bars are close to the upper surface of the layer stripper carriage LSC when the carriage is in its forward position, ready to receive the rows of cases from the row diverter RD. The rearward end of each bar is inclined outward so that cases entering between the bars will be cammed inwardly and, accordingly, the final width of the layer will correspond to the distance between the bars. With this arrangement, there is no necessity for extreme accuracy in stopping the cases on the row accumulator. For example, the position of the case-intercepting bar that stopped case C12 (FIG. 1) is not critical since, if the gap created between cases C11 and C12 is greater than the desired gap, the guide bars will reduce the gap when they compress the row as it moves onto the stripper carriage. Another obvious advantage of the guide bars resides in their ability to accurately position the layer above the pallet on which it is to be deposited and, due to the fact that the bars are mounted for adjusting movement toward and away from each other, the size of the layer can be made to conform to several sizes of pallets.

Each guide bar 717 and 718 (FIG. 18) is an inverted relatively shallow channel member that is bolted at its forward end to a transverse angle bar 719. Two spaced blocks 720 and 721 are secured in fixed position on the upper surface of angle bar 719, each block having a semi-cylindrical recess 722 (FIG. 19) in its upper surface. The walls of the recess 722 have ridges and grooves which correspond to the threads in a portion of an internally threaded tube so that, when the blocks 720 and 721 are raised into engagement with a threaded transverse rod 723 certain threads on the rod are received in the grooves on the blocks and the guide bar is thereby locked against movement transversely of the stripper carriage. It will be noted in FIG. 19 that, at a point a short distance rearwardly from its front end, the undersurface of each guide bar 717 and 718 rests on a transverse angle bar 725 which is part of an electrical switch structure to be described hereinafter. The bar 725 acts as a fulcrum whereby the relatively long rearward portion of the guide bar is effective to swing the short forward portion upwardly and thus maintain the locked engagement of the threaded rod 723 and the blocks 720 and 721. The position of each guide bar can be changed by pivoting it clockwise (FIG. 19) about the angle bar 725 to move the blocks out of engagement with the rod 723, and then sliding the guide bar laterally to the desired position.

The load elevator LE (FIG. 19) comprises a rigid frame 730 which includes two spaced transverse angle bars 731 and a pair of spaced longitudinal bars 732 (FIG. 22) all welded together to form a rigid member on the upper surface of which two spaced longitudinal angle bars 733 and 734 are bolted. A plurality of rollers 736 are mounted in and extend between said bars 733 and 734, to form a table T said rollers being substantially identical to the rollers 80 of the row accumulator conveyor RA since they have hexagonal inner shafts 737 (FIG.

19), and tubular outer shaft 738. They also have short sprocket and chain drive units 739 at the ends of the shafts so that all shafts are simultaneously driven in the same direction of rotation. One of the rollers, indicated by reference numeral 736A in FIG. 19, is driven through a sprocket and chain drive 740 by a motor M3 that is mounted in the frame 730.

The leading roller 736B is not mounted directly on the angle bars 733 and 734 but is pivotally mounted thereon by two levers 744 and 745 (FIG. 21), each lever being pivotally secured to the adjacent angle bar by the hexagonal inner shaft of the roller 736 next behind the roller 736 next behind the roller 736B. When no load is on the roller table, as when the table is being elevated after having discharged a loaded pallet, springs 747 (FIGS. 19 and 21) which are connected between fixed stud bolts 748 and the ends of levers 744 and 745 pivot the levers counterclockwise until the ends of the levers abut fixed stops 749 and the roller 736B is in an elevated position. Before the table is raised, a pallet is moved onto the table T and comes into contact with the raised roller 736B. The levers 744 and 745 are pivoted clockwise to the position shown in FIG. 19 at which time the rollers of the table are stopped, in a manner to be described presently. Since the rollers are positively driven through chain mechanisms at relatively slow speed, they can be stopped quickly so that the position of the pallet on the table is accurately located. As the table is elevated with the empty pallet thereon, the latch levers 751 pivot counterclockwise by gravity to the position of FIG. 19 to latch the roller 736B in place. Accordingly, while the pallet is being loaded and lowered step by step, the stop roller 736B is latched in the position shown in FIG. 19. When the pallet is loaded and is ready to be discharged from the machine, the elevator is moved to its lowermost position, causing bolts 754 to project through openings 755 (one only being shown) in the angle bars 733 and 734 and engage the latch levers 751. The latch levers are thus pivoted clockwise to release the levers 744 and 745. Then when the motor M3 is energized and the rollers 736 are driven the stop roller 736B will be swung down to a position wherein it forms a continuation of the roller table and permits the loaded pallet to be discharged from the machine.

The frame 730 and the roller table mounted thereon are raised and lowered by means of a lifting mechanism 759 which includes a motor M2 that is mounted in the vertical post 58. The power shaft of the motor is coupled to a vertical threaded shaft 761 which is journalled for rotation in spaced bearings 762 and 763. A magnetic brake 760, which may be of the same type as brake 682, is suitably mounted in the machine and adapted to stop rotation of shaft 761 when it is de-energized. An internally threaded block 765 is disposed on the threaded shaft 761, and two chains 766 and 767 are secured to the block by bolts 768 (FIG. 21). Each of the chains is trained around a sprocket 770 keyed to a shaft 771 which extends across the end of the machine and is journalled for rotation in bearings 772, 773, and 774 secured to vertical post 58 and to the vertical post 59. Four sprockets 775, 776, 777, and 778 are keyed to shaft 771. A chain 780 is secured to one corner of the forward end of the table by a special bolt 781 (FIG. 21) and extends upwardly around the sprocket 776 and has a counterweight 779 secured to its end. Similarly, a chain 782 is connected to the other forward corner of the table, is trained around sprocket 777, and has a counterweight 783 secured to its end. A chain 784 (FIG. 19) is secured to one rear corner of the table and is trained around a sprocket 785 which is mounted on a short shaft 786 that is journalled in bearings (not shown) in the walls of box beam 65. The chain 784 extends forwardly from the sprocket 785, is trained around sprocket 778, and is connected to the counterweight 783. Similarly, a chain 789 (FIG. 18) is connected to the other rear corner of the table and is trained over a sprocket 787 that is keyed to a short shaft 788 journalled for rotation in bearings in the opposite walls of box beam 62. The chain 789 extends forwardly from the sprocket 787, is trained around sprocket 775, and is connected to the counterweight 779.

It will be evident that, when the motor M2 is operating, the block 765 will move up or down the shaft 761 and through the shaft 771 and the sprockets and chains associated with the shaft will raise or lower the table.

As previously mentioned, after a loaded pallet has been discharged from the machine, the table receives an empty pallet from the pallet feed conveyor. It is desirable that this empty pallet is centered directly under the layer of cases being positioned on the layer stripper carriage so that when the layer is dropped onto the pallet it will be properly centered thereon and so that the positioning of additional layers on the pallet will not cause an unstable load condition. To properly position the empty pallet on the table, two guide bars 800 and 801 (FIG. 22) are provided. Each bar has a slanted guide portion 802 and a portion 803 that is substantially parallel to the longitudinal centerline of the table. The distance between the opposed portions 803 should, of course, be coordinated with the width of the pallet being used so that proper centering of the pallet will take place.

Each guide bar has a rearward end 804 (FIG. 24) welded to an upstanding float lever 805 which has a short inverted channel member 806 welded to one face and a locking block 807 bolted to its opposite face near its lower end. The channel 806 is disposed over a tubular bar 810 which is mounted in fixed position on the rear end of the table support frame 730. The locking block 807 has a semi-cylindrical recess 811 in which ridges and grooves are formed corresponding to the threads on a portion of an internally threaded tube so that, when the block 807 is moved into engagement with a threaded transverse rod 813 that is secured between spaced arms 814 of the frame 730, the threads on the rod 813 will be engaged in the ridges and grooves of the block, and the guide bar will be locked against lateral movement relative to the table. To unlock the guide bar, it is pivoted counterclockwise (FIG. 24) to disengage the block 807 from the threaded rod 813. The guide bar can then be adjusted toward or away from the centerline of the table. It will be evident that, since the guide bars 717 and 718 above the layer stripper and the guide bars 800 and 801 are all adjustable relative to the longitudinal centerline of the stripper carriage, the position of the layer of cases being formed and the position of the pallet onto which it is to be transferred can be effectively coordinated.

Each of the pallet feed conveyors 53 and 54 comprises two endless chains 830 and 831 (FIG. 2) which are mounted for circuitous movement in spaced guide plates 832. The upper run of each chain extends above the upper edges of the guide plates to receive a pallet and convey it into the machine. Conveyor 53 is driven by a motor M5 (FIG. 3) through a conventional drive mechanism, and conveyor 54 is driven by a motor M6. As will be explained presently, the two conveyors are so controlled that as soon as the first conveyor 53 delivers a pallet to the table of the load elevator LE, the second conveyor 54 will transfer a pallet to the first conveyor 53.

The drive mechanism for the machine includes six motors M1, M2, M3, M4, M5 and M6. As previously mentioned motor M2 (FIG. 19) is arranged to rotate the shaft 761 to raise or lower the load elevator LE. As seen in FIG. 3, the motor M5 is arranged to drive the endless chain pallet feed conveyor 53. The remainder of the drive mechanism of the machine is shown diagrammatically in FIG. 25 wherein it will be seen that the shaft 202, which drives the input shaft 201 of gear box 199 through chain 203, is driven by motor M1 through a belt and pulley drive 897 and a sprocket and chain drive 898. As previously mentioned, the chain 203 also drives the drive member of a one-revolution clutch 173 while the gear box 199 has shafts for causing the reciprocation of the push rod 190 of the case pusher CP and for rotating the shaft 97 which, in turn, drives the belts 90 and 91. When the clutch 173 is actuated the camshaft 171 is rotated through a single revolution, causing a single revolution of cam 170 which controls the raising and lowering of the conveyor feed belts 100, of cam 264 which is effective at certain times to raise one set of rollers of the case turner CT, of the two cams 460 and 406A which control the raising and lowering of the row diverter belts 145, of cam 396 which controls the raising and lowering of the gap-forming stop bar 300A to obtain a gap between cases on the row accumulator, and of a timing cam 899 which actuates two stitches MT-1 and MT-2 that are part of the electrical control circuit. Also, the camshaft 171 rotates a shaft 900 which drives a program chain that is also part of the electrical control circuit to be described presently. The camshaft 171 drives the program shaft 900 through a gear mechanism 901 and accordingly one revolution of camshaft 171 causes only a part of a revolution of the program shaft.

The motor M1 also drives shaft 436 which actuates the belts 415 of the row diverter RD to move an assembled row of cases from the row accumulator RA to the layer accumulator. The motor M1 is a Sterling Gear Motor having one output shaft 905 rotatable counterclockwise and a second output shaft 904 rotatable clockwise which drives shaft 436. The shaft 905 also drives the shaft 631, which actuates the belts 660 and 661 and chain 670 that rotate the rollers 600 of the layer stripper carriage LSC, the shaft 905 being connected to shaft 631 by means of the belt and pulley drive 897 and a chain 906 connecting shafts 907 and 631. It will therefore be evident that, when the motor M1 is energized, the rollers of the layer stripper carriage LSC will immediately start to rotate, as will the rollers 80 of the case diverter conveyor, the rollers 222 of the case turner conveyor, and the rollers 300 of the row accumulator conveyor.

Motor M4 (FIG. 25) drives the feed conveyor drive shaft 73 through a chain and sprocket mechanism 915, and shaft 73 in turn drives shaft 105, to which the drive pulleys of the V-belts 100 are keyed, by means of the chain and sprocket drive 163.

The electrical control circuit includes a plurality of limit switches that are located at particular areas of the machine to control certain operations. A switch LS-1 (FIG. 26) is mounted on a vertical bar 918 which is secured to a wall of the post 61 and is held in spaced relation to the wall by spacers 919 (one only being shown in FIG. 27). A rod 920 is slidably held in two spaced clamps 921 (FIG. 26), each of which is secured to the mounting bar 918 and has two plates 922 that frictionally grip the rod 920. A switch actuator 923 is secured to the bar 918 intermediate its ends and collars 924 and 925 are adjustably secured to opposite ends of the rod 920 in the path of movement of a plate 926 that is mounted on the arm 814 of the load elevator frame 730 that is adjacent column 61. The plate 926 has an arcuate recess 927 which is large enough to receive the rod 920 and the clamp plates 922 but not large enough to permit passage of either of the collars 924 or 925. Accordingly, during upward movement of the load elevator, the plate moves upwardly until it contacts and raises collar 924, causing switch actuator 923 to engage an arm 929 of switch LS-1. As the actuator continues upward, arm 929 is raised to a vertical position while an arm 930 is moved to a laterally projecting position. When the elevator is subsequently lowered, the plate 926 engages the lower collar 925, pulling the rod 920 downwardly and causing switch actuator 923 to engage switch arm 930 and swing it downwardly, returning arm 929 to its laterally projecting position.

A switch LS-14 is mounted on vertical bar 918 and has an arm 934 that is arranged to be engaged and actuated by the plate 926 when the load elevator is in its lowered position. The switch LS-14 has normally open contacts LS-14B that are closed when contacted by plate 926 as the elevator reaches its lower position, and has contacts LS-14A that are opened by plate 926.

A switch LS-12, which is adjustably mounted on bar 918, by a releasable clamp 937, is provided with two arms 935 and 936. During upward movement of the load elevator, a tab 938 that projects laterally from one of the arms 814 of the elevator frame contacts arm 935 and actuates the switch. As the elevator descends, the tab engages arm 936 and swings arm 935 to its original position.

A switch LS-10 (FIG. 18) is mounted at the forward end of the machine adjacent the forward end of the case guide bar 718. The actuator of this switch is the stop bar 51 which extends across the forward end of the machine in position to be engaged by the leading cases of a layer of cases received from the layer accumulator. The bar 51 is mounted between two identical levers 982 and 983 (FIGS. 21 and 28) which are pivotally mounted on two spaced vertical plates 978. The vertical plates are secured to opposite ends of the angle bar 725 so that the two plates and the bar form a carriage on which the actuator bar is pivotally mounted. A switch contact member 984 is adjustably mounted on one arm of the lever 982 in position to engage an arm 985 of the switch LS-10. A channel 980 is welded to the outer surface of each plate 978, and two rollers 981 are rotatably mounted on each channel and adapted to roll along a track defined between two fixed spaced plates 987. A pair of vertically aligned apertures 980A are provided in each channel 980 and, by rolling the carriage along the guide track, apertures 980A can be aligned with one pair of a plurality of pairs of aligned apertures 987A in the spaced plates 987. At each side of the machine, a pin 988 is adapted to be inserted in the four aligned apertures to lock the carriage in fixed position. The provision of this adjustable stop bar makes it possible to position the forward edge of the layer of cases at a desired location relative to the forward and rearward edge of the pallet on which the layer is to be discharged. Obviously, the edge of the layer can be made to coincide with the edge of the pallet. Or, when the layer is not as long as the pallet, the layer can be centered on the pallet. When the advancing layer of cases engages bar 51, it swings lever 982 counterclockwise causing contact member 984 to actuate the arm 985 of switch LS-10 and close the contacts of the switch. When the layer of cases is dropped from the stripper carriage, it remains in contact with switch actuator bar 51 until the table is lowered. When the bar 51 is released by the cases, a spring 986 swings lever 982 clockwise, releasing switch arm 985, permitting the contacts of LS-10 to open.

A switch LS-8 (FIG. 30) is mounted on the inside face of the angle bar 733 of the load elevator table and has a rotary actuator member 989 which projects through an opening in the bar 733 and has a U-shaped clip 990 secured thereto. A button 991 secured to the lever 744 projects into the clip 990. When a loaded pallet is being discharged from the machine, the leading roller 736B is in the position shown in phantom lines. After the load has been discharged, the spring 747 swings arm 744 counterclockwise, causing the button to engage arm 990A of clip 990 and rotate the actuator 989 clockwise to open a set of normally closed contacts and close a set of normally open contacts. When the table has been raised to the position opposite the pallet stripper carriage and a pallet is moved onto the table, the pallet engages roller 736B and swings it clockwise, causing the button to engage 990B of clip 990. The rotary actuator 989 is thus rotated counterclockwise to close the normally closed contacts and open the normally open contacts.

controls the case turner, the switch P2 is connected to the solenoid 473 that controls the row diverter, the switch P3 is connected to a relay in the control circuit that controls the discharge of layers from the stripper carriage LSC, and switch P4 is connected to the solenoid 390 that controls the gap forming case stop which forms gaps in the case row.

When case #1 closes switch LS–A, the case turner solenoid and the row discharge solenoid are energized. Then, as the case moved over the case turner CT, the cam 264 will raise the roller section 221 upwardly against the associated brake to cause the case to be rotated 90°. Since there is no row on the row accumulator, the raising of the belts 415 performs no operation at the start of a layer forming operation. When case #2 actuates switch LS–A, the case turner solenoid and the layer discharge relay are energized. As a result case #2 is rotated 90° when it passes over the case turner. Since no previously formed layer is on the stripper, actuating the layer discharge relay has no function at this time. When case #3 actuates switch LS–A, the case turner solenoid will be energized and case #3 will be turned 90°. There will now be a row of three cases formed on the row accumulator.

Case #4 activates the case turner and the row discharge mechanism. Accordingly, the row made up of cases #1–#3 is discharged onto the stripper carriage as case #4 is turned 90° and moves to a position against stop roller 50 of the row accumulator. Cases #5 and #6 also activate the case turner and are turned 90° and positioned adjacent case #4 on the row accumulator to form a second row. Case #7 actuates only the row discharge mechanism and, therefore, the second row of cases is discharged onto the stripper carriage as the unturned case #7 moves toward the stop roller 50. Case #8 does not actuate any solenoids and keeps its original orientation as it moves to position alongside case #7. Case #9 actuates the solenoid associated with the gap-forming roller 300A and the roller is raised in front of case #9 to stop it in spaced relation to case #8. Case #10 does not actuate any switches and therefore it moves to a position adjacent case #9 to complete the third row of cases.

If a locked load of layers of cases is to be formed, the orientation of the cases of the second layer should be different from that of the cases of the first layer. One such second layer comprising cases #11–#20 is illustrated in FIG. 37, and the program control rod settings for cases #11–#20 are shown in the chart of FIG. 35. It should be noted that case #11 causes the discharge of the third row of the first layer and that cases #12 causes the discharge of the layer from the stripper carriage onto the pallet. Also, in the second layer, the gap is formed between cases #12 and #13 and therefore case #13 raises the gap forming stop bar 300A. The remainder of the control operations of cases #11–#20 will be evident from a study of the chart. Also, from the previous discussion, it should be evident how subsequent layers are formed and discharged. It should be noted that the first case in each row should actuate the row discharge solenoid to clear a previously formed row from the row accumulator, and the second case in the first row of each layer should actuate the layer discharge relay. The chain can be made as long as is necessary to form a complete load of interlocked layers. A load of suitable stability may be obtained if the previously described first and second layers are alternated to form the entire load. However, if it is desirable to locate the gaps at different locations or to rearrange the cases to form differently arranged layers, the suitable large rollers can be quickly installed on the program chain. It is of course desirable that the chain has a suitable number of control rods 1005 such that when a complete load has been formed, the chain is stopped at a position in which the control rod corresponding to the first case of the next load is in the "home" position.

A manually operated switch HS is shown in FIG. 38 in a circuit with a relay UR. When this switch is closed, a relay contact UR–1 in the circuit of the second timing, switch MT–2 is closed. Switch MT–2 is always closed when the camshaft 171 stops rotating. Accordingly, if the program chain is not at "home" position and no more cases are coming into the machine, the manual closing of switch HS will cause the repeated actuation of the one-revolution clutch 173 whereby the program chain will be progressively moved to "home" position. When "home" position is reached, a large roller (not shown) which may be on an extension of the control rod 1005 of the first case of the first layer, opens switch P5 to prevent further energization of the clutch through MT–2.

The electrical system which controls the operation of the pallet elevator, the load elevator, the pallet feed conveyor, and the case feed conveyor is separate from the program chain circuit. A cycle of operation of these mechanisms, starting with the operations that take place after a completed layer of cases has been formed on the layer stripper carriage will be described in connection with FIG. 3 and with the control diagram of FIG. 39 wherein M1 is the main drive motor, M4 is the motor driving the case feed conveyor, M2–D indicates the windings of motor M2 that drive the load elevator LE down, M2–U indicates the windings of motor M2 that cause the load elevator to be elevated, M3 is the drive motor for the table rollers 736, and M5 and M6 are the motors that drive the pallet feed conveyor 53 and 54.

At the start of this cycle the load elevator LE will be considered to be in its uppermost position supporting a pallet directly beneath the layer stripper carriage LSC which is in its forward position holding the contacts of switch LS–13 (Line 22) open. When start switch SW–1 is closed, the main motor M1 is energized through a circuit connected between lines L1–L2 which supply 115 volt A.C. current. An interlock M1–1 in circuit 2 keeps M1 energized. When motor M1 is energized the rollers 600 of the layer stripper carriage will be rotated clockwise (FIG. 3).

When the first row of cases is diverted onto the stripper carriage, they are advanced over the layer stripper carriage, and the leading cases engage the actuator 51 of switch LS–10, opening contacts LS–10A in circuit 4 and closing contacts LS–10B in circuit 6. Also, the cases engage the radial fingers on the second roller 600A, causing LS–15 to be actuated, causing contacts LS–15A in circuit 6 to open and contacts LS–15B in circuit 8 to close, preparing a circuit to relay C. Two more rows of cases are diverted onto the layer stripper, as indicated in FIG. 36. When the second case of the next layer (identified as C–12) trips LS–A, contact P3 (FIG. 38) energizes relay E. Contact E1 in line 8 closes to energize relay C. When relay C is energized, contacts C–1 in circuit 23 close the load stripper carriage brake 682 is energized, since normally open contact B–1 is closed due to the fact that relay B in circuit 4 is energized through contact LS–12A, contact LS–1A in circuit 6 having been closed by the load table when it reached its upper position. Therefore, the brake 682 is released and the clutch 680, through contact C–2, is energized to drive the layer stripper carriage rearwardly.

As the layer stripper retracts, the layer of cases moves off the rollers causing switch LS–15 to be released, whereby contact LS–15A in circuit 6 closes and contact LS–15B in circuit 8 is opened to de-energize relay C. Contact C–2 in circuit 24 opens to de-energize the clutch 680 and permit the torsion spring on the layer stripper carriage to urge the stripper toward the front of the machine. The brake 682 remains energized, allowing the shaft 642 to continue rotating due to the fact that switch LS–13 in circuit 22 was allowed to close as the stripper was retracted.

Since contacts LS–15A in circuit 6 are now closed, contacts LS–10B are still held closed by the layer of cases, A switch LS-13 (FIG. 18) is mounted at the forward end of the layer stripper zone just above the path of forward movement of the layer stripper carriage. This switch has an actuator 992 (FIG. 28) that extends downwardly into position to be engaged by the leading roller 600B of the stripper carriage. When the roller 600B engages and moves the actuator 992, normally closed contacts of the switch are opened.

As previously mentioned, switch LS-15 is mounted on a side wall of box beam 62 and is arranged to be actuated in response to a row of cases engaging the fingers 698 (FIG. 29) on the roller 600A of the layer stripper carriage. When cases are moved into engagement with the fingers, roller 600A is rotated clockwise, causing roller 704 to rotate tube 712 clockwise and swing switch actuator 714 upwardly to actuate the switch. As a result, a set of normal closed contacts are opened and a set of normally open contacts are closed. When the last row of cases is stripped from the carriage, the spring 716 pulls the actuator 714 downwardly, returning the contacts of the switch to their original position and rotating the carriage roller 600A to its original position.

A safety switch LS-16 (FIG. 19) which may be adjustably mounted adjacent the rear end of the stripping zone, has an actuator 993 arranged to be engaged by the bent arm 702 carried by the carriage roller 600A. This switch is so located that it will not be actuated as long as layers of normal size are being formed and discharged by the stripper carriage. However, if a layer is extra long, the bent arm 702 will actuate the switch LS-16 and stop the entire machine before the stripper carriage travels too far rearwardly.

A switch LS-20 (FIG. 3) is mounted adjacent the upper run of the pallet feed conveyor. When a pallet is carried on the conveyor and is in a position ready to be discharged onto the load elevator, the pallet is in engagement with switch LS-20.

A similar switch LS-21 is mounted on conveyor 54.

Referring to FIG. 25, it will be seen that, when the camshaft 171 is rotated through one revolution, the case turning control cam 264, the gap forming case stop cam 396, and the row diverter cams 460 are each rotated one complete revolution. However, as previously mentioned, these cams cannot carry out their control function unless associated solenoids are energized. In the present machine, a program chain 1000 (FIG. 31) controls the operation of the solenoids. The chain is an endless member comprising a plurality of connector links 1001 (FIG. 33) which have a yoke portion defined by arms 1002 and 1003, and a third arm 1004 that extends away from arms 1002 and 1003. The third arm 1004 of one link is disposed between the arms 1002 and 1003 of an adjacent link, and aligned holes in all three arms receive a mounting or case control rod 1005 which has two portions 1005A and 1005B projecting equal distances on opposite sides of the links 1001. Twelve rollers R1-R12 are mounted on each rod and, accordingly, the rollers define columns on the chain, i.e. all rollers R1 define a first column and rollers R2 define a second column. O-rings 1006 of rubber or suitable synthetic material lock the twelve rollers on the rod. Rollers R1, R6, R7 and R12 are identical cylindrical rollers and are adapted to fit between adjacent teeth of four sprockets 1007 that are secured to the program chain shaft 900, so that rotation of the shaft 900 will cause the chain to be moved relative to eight switches P1-P8 that are secured to a mounting member 1008 in alignment with the columns defined by rollers R2-R5 and R8-R11 respectively. The mounting member has a hooked end portion 1009 disposed around a rod 1010 that is carried in a support structure 1011 secured to a side plate of the machine. A clamping bar (not shown) is anchored in the structure 1011 and overlies the mounting member 1008. When the program chain is to be replaced, the clamping bar is swung aside, the member 1008 pivoted upwardly, and the chain lifted off the sprockets. The gear mechanism that drives shaft 900 is such that for each revolution of camshaft 171, the chain is moved relative to the switches a distance equal to the distance between adjacent rods of the chain.

The switches, which are shown only diagrammatically in FIG. 31, may be sub-miniature switches of the type known as Licon 16-404. The mounting for the switches and the program chain are disclosed in detail in the application of Ernest A. Verrinder and Francis Curtis, Serial No. 247,143 filed December 26, 1962, now Patent No. 3,193,527 and reference may be had to said application for details of construction and operation that are not specifically mentioned herein.

In FIG. 33, a rod is shown having rollers R3, R5 and R8-R11 that are identical to roller R1 while rollers R2 and R4 are of enlarged diameter. The size of the rollers is so chosen that only the large rollers R2 and R4 will actuate the associated switches when they are moved to a position thereunder. In a control operation to be explained presently only four solenoids are to be actuated and these solenoids are associated with switches P1-P4. Accordingly, there is no need for actuating switches P5-P8 and therefore all rollers R8-R11 on all mounting rod portions 1005B will be small diameter rollers that cannot actuate switches. It will be understood however that any of the rollers R2-R5 and R8-R11 may be large diameter rollers if desired.

In the chart shown in FIG. 35, a control sequence is illustrated for the layer of cases formed as indicated in FIG. 36. It should be noted that this layer is not square but is rectangular and accordingly, the bar 711 at the forward end of the stripper zone may have to be adjusted to center this load on a square pallet. In the chart of FIG. 35 the mounting rod 1005 that corresponds to each case is listed down the side of the chart and a letter X is placed opposite the rod for each large switch-actuating roller placed on that rod. For example, the first line, indicated that Rollers R2 and R3 on the mounting rod associated with the first case in the layer are large rollers adapted to actuate switches P1 and P2. It will be understood that, at the beginning of a pattern-forming cycle, the rod corresponding to case No. 1 will be at the "home" position, indicated in FIG. 32, with the large rollers on the rod engaging and holding closed the associated switches. Then, when the first case enters the machine and trips switch LS-A to cause rotation of the camshaft 171 and movement of the program chain in the direction of arrow A (FIG. 32), the switches remain closed for about 240° of camshaft rotation, and then they are allowed to open. At about 350° of camshaft rotation, the large rollers associated with the next case close the switches. Referring to the control diagram of FIG. 38, it will also be noted that, when switch LS-A is closed by an incoming case, circuits are closed through whichever ones of the switches P1-P4 is held closed at that time, and the case will hold switch LS-A closed for more than 30° of camshaft rotation until timing switch MT-1 closes to keep the circuits energized. At 180° of camshaft rotation, the timing switch MT-1 opens to open the circuits. It will of course be obvious that the control operation that depends on the closing of any of the switches P1-P4 must be accomplished while the timing cam 899 keeps the circuits closed. Further, it will be evident that the circuits are broken by means of the switch MT-1 rather than by opening the contacts of the miniature snap-action switches P1-P4. In FIG. 38, diagrammatic sketches of the camshaft 171 are shown adjacent the switches P1-P5, MT-1 and MT-2, each sketch indicating by a cross-hatched area, the "open" period of the associated switch.

The formation of a layer of cases will be described with reference to the chart of FIG. 35. It should be noted that switch P1 which is arranged to be actuated by roller R2 is in a circuit with the solenoid 277 that and contacts LS–1A were closed during upward movement of the load elevator, motor windings M2–D are energized to start the elevator down.

As the elevator moves down, the cases release the actuator 51 of switch LS–10, closing contacts LS–10A in circuit 4 and opening contacts LS–10B in circuit 6 to de-energize M2–D. The torsion spring then returns the stripper carriage to its position above the load elevator, the leading roller of the carriage contacting and opening switch LS–13 (circuit 22) to de-energize the brake and cause it to hold shaft 642 against rotation. Then the next layer of cases comes in row by row and the layer discharging and elevator lowering operations are repeated.

When a predetermined number of layers are on the table, the tab 938 on the elevator engages LS–12 closing contacts LS–12B in circuit 7. The motor windings M2–D are then energized through contacts LS–1A, LS–12B, and LS–15A which are closed when the stripper is retracted, and the load elevator is lowered all the way to the bottom, since the contacts LS–10B in circuit 6, which are opened when the cases pass out of contact with LS–10, are bypassed. As the elevator reaches its lowered position, contacts LS–1A in circuit 6 are opened, de-energizing M2–D. Contacts LS–14B of switch LS–14 in circuit 10 are also closed by the elevator in its lowered position and motor M3 is energized to rotate the rollers on the table to carry the loaded pallet out of the machine. At the same time contact M3–3 in circuit 15 is closed and motor M5 is energized to drive the pallet feed conveyor 53 which conveys an empty pallet onto the table of the load elevator. It is to be noted that a pallet on conveyor 53 will hold LS–20A open.

As the empty pallet leaves the pallet feed conveyor 53, it allows contacts LS–20A in circuit 14 and contacts LS–20B in circuit 17 to close. Motor M6 of pallet feed conveyor 54 is energized through contact M5–2 and switch LS–20B and an empty pallet is transferred from feed conveyor 54 to conveyor 53. When this new pallet reaches its assigned position on conveyor 53, it opens contacts LS–20A and LS–20B. Accordingly, motor M5 will be de-energized as soon as motor M3 is de-energized, and motor M6 will be de-energized as soon as motor M5 stops.

As the loaded pallet leaves the load elevator, the roller 736B is raised, and contacts LS–8A in circuit 10 are opened and contacts LS–8B in circuit 11 are closed. Relay coil F–L in circuit 12 is energized through closed contacts LS–8B. Relay F–L is a latching relay of the type marketed by Struthers-Dunn Inc., under the designation DUNCO 255. In general, such latching relays have two coils. One coil carries the relay armature and contacts and is designated F–L; the other coil carries a mechanical latch which will hold the relay in the energized position and is designated F–UL in circuit 9. When coil F–UL is energized, the relay armature is free to return to the de-energized position.

When relay coil F–L in circuit 12 is energized, contact F–1 in circuit 10 opens but contact F–2 in circuit 11 closes so motor M3 remains energized. Accordingly, the table rollers keep rotating and the empty pallet from conveyor 53 keeps advancing across the table. This new pallet closes contacts LS–8A in circuit 10 and opens contacts LS–8B in circuit 11, de-energizing motor M3 to stop the table rollers. It is to be noted that latch relay coil F–L in circuit 12 is not de-energized when contacts LS–8B are opened. Accordingly, contacts F–1 in circuit 10 remain open, preventing the energization of M3.

When M3 is de-energized, contacts M3–2 in circuit 13 close and the windings M2–U of the load elevator are energized through contacts LS–1B that are closed when the table is in its lowered position. Accordingly, the table starts upwardly with the empty pallet. Contacts LS–14A in circuit 9 close to energize the reset coil F–UL of the latch relay F, causing coil F–L in circuit 12 to be de-energized. When the desired upper position of the elevator is reached, the table closes contacts LS–1A in circuit 6 and opens contacts LS–1B in circuit 13 to de-energize raise coils M2–U and stop the upward movement of the table.

Relay B in circuit 4 is again energized when contacts LS–1A are closed by the table in its upper position. Accordingly, contacts B–1 in circuit 22 are closed, preparing circuits through C–1 and C–2 so that when relay C is again energized and contacts C–1 and C–2 are closed, the stripper carriage can be retracted to deposit the next layer on the empty pallet.

A brief resume of the operation of the machine will be described with reference to FIGS. 1, 3 and 35. As each case leaves the feed conveyor FC and enters the case diverter CD on the belts 100, it engages switch LSA to energize a single revolution clutch that drives camshaft 171 through one revolution. During this revolution of the camshaft, the program chain actuates certain solenoids depending upon whether or not the case is to be turned, whether the gap-forming roller is to be raised in front of the case, or whether or not a previously-formed row is to be discharged from the row accumulator RA or a layer is to be stripped from the layer stripper carriage LSC. Also, during the revolution of the camshaft, the cam 170 lowers the belts 100 permitting the case to be deposited on the rollers 80 of the case diverter CD which then move the case sidewise onto the case turner CT. The case may proceed onto the row accumulator conveyor RA without being turned and then will be one of several cases making up a row of cases having the same orientation as they had on the case feed conveyor FC. If the case is turned 90° on the case turner it will be one of a row of cases formed on the row accumulator with this new orientation. If the program chain has actuated an appropriate solenoid, the gap-forming roller 300A will pop-up in front of the case to stop it in spaced relation to the case preceding it.

When a row has been formed, the program chain control bar associated with the first case of the next row will actuate the row diverter RD to raise the belts 415 which will carry the row onto the stripper carriage where it will abut the stop bar 51 or will abut a row of cases previously disposed on the layer accumulator.

When a layer of cases is formed on the stripper, the program chain control rod associated with the second case in the first row of the next layer will cause the energization of relay C whereby the stripper carriage will be driven rearwardly. When the entire layer has been deposited on a pallet held by the table T, the table will be lowered, the stripper carriage will be returned by its torsion spring to its forward position, and a second layer will be conveyed onto the layer stripper carriage LSC.

When the desired number of layers of cases has been formed on the table, the table will move to its lowermost position, the rollers of the table will be rotated, and the load will be conveyed out of the machine onto the discharge conveyor DC, while an empty pallet is being automatically positioned on the table. When the load is discharged, and the empty pallet is in place, the load elevator LE carries the table upwardly, to position the empty pallet in position below the stripper carriage to receive subsequent layers of articles formed on the carriage.

In FIGURES 40 and 41 a second embodiment of the compact palletizer of the present invention is illustrated. This palletizer is in general identical to that of FIGURES 1–39, the only difference between the two machines being that, in this second embodiment, the empty pallet is brought into the machine at the side of the machine from which the loaded pallet is removed rather than being brought in from the opposite side. Comparing FIGS. 3 and 41 it will be noted that in the machine of FIG. 3 the empty pallets are moved into the machine by conveyor 53 which is in alignment with the table of the pallet elevator and with the discharge conveyor. In the FIG. 41 machine, each empty pallet is brought into the machine by an endless chain conveyor 1100 that is positioned below a conveyor 1101 which discharges loaded pallets. The arrangement of FIG. 41 is even more compact than the arrangement of FIG. 3 since no floor space on the left side of the frame support structure is required.

Since all of the mechanisms of the FIG. 41 machine are substantially identical to those of the FIG. 1–39 machine, only those parts of the second embodiment that are different will be described in detail. It will be noted that the main difference, other than the conveyor arrangement, will reside in the control mechanism since the table T′ of the load elevator will have to be stopped during its downward movement to discharge the loaded pallet onto discharge conveyor 1101 and then will have to be moved to a lower position in alignment with the pallet feed conveyor to receive an empty pallet.

The table T′ is identical to the previously described table T with the following exceptions. A stop plate 1104 is mounted across the rear end of the table to act as a positive stop to arrest the movement of the empty pallet. The stop bar 736B (FIG. 30), the switch LS–8, and the spring actuating and latching mechanism associated with the bar 736B of table T are not mounted on table T′.

The pallet feed conveyor is identical in construction endless chains whose upper runs provide a pallet support to the feed conveyor 53, being made up of two spaced ing and conveying surface. A motor M7 is connected to the drive shaft of the conveyor in a conventional manner.

The load discharge conveyor 1101 may be a typical roller conveyor having a conveying surface of freely rotatable rollers. The support structure is elevated so that the fork of a fork lift truck can readily enter the space beneath the conveyor to place an empty pallet on the conveyor 1100. While it is evident that the discharge conveyor 1101 could be powered and made a part of a conveying system for carrying the loaded pallet to a distant location, in the embodiment of FIG. 40, it is designed so that the loaded pallet will be held on the conveyor 1101, against a stop bar if necessary, so that the loaded pallet can be engaged and carried away by a fork lift truck. The empty pallet may be placed on the feed conveyor 1101 manually or by means of a fork lift truck.

The palletizer of FIG. 41 has the following microswitches; LS–A, LS–1, LS–10, LS–12, LS–15, LS–17, LS–18, LS–19 and LS–22. All of these switches with the exception of switches LS–17, LS–18, LS–19 and LS–22, are identical to the correspondingly numbered switches in the machine of FIGS. 1–39 in design, in the manner and place in which they are mounted on the machine, and in the manner in which they are actuated by moving elements of the machine and by the articles being palletized.

Switch LS–17 (FIG. 41) is mounted on the rear wall of the table T′ and is arranged to be opened when its actuator arm is engaged by an empty pallet as the pallet is moved to position on the table T′.

Switch LS–18 is mounted in position to be actuated by the table T′ when the table reaches its lowermost position.

Switch LS–19 is mounted on the frame of the machine at the loaded pallet discharge position. This switch has an actuator arm 1107 that is adapted to be engaged by the table T′ when it reaches the discharge position to thereby close the switch. The actuating arm 1107 is of the type that can be swung up or down from a neutral position but is effective to close the contacts of the switch only when moved downwardly from the neutral position to which it automatically returns by spring action.

Switch LS–22 is mounted on the table T′ and has an actuator projecting to a position above the upper surface of the rollers of the table so that a pallet on the table will hold the switch LS–20.

A stop paddle 1112 (FIGS. 42 and 43) is mounted on the discharge side of the table T′ intermediate the sides of the table. This paddle is mounted in suitable guides in the table for vertical reciprocating movement from a raised position preventing the discharge of a loaded pallet to a lowered position wherein the upper end of the paddle is below the surface of the rollers of the table. The paddle is pivotally connected to a lever 1113 that is pivoted on a pin 1114 which is formed on a tab 1116A projecting upwardly from the central portion of a bar 1116 that extends transversely across the lower end of the table. A solenoid S is connected to the lever 1113 near the pivot axis of the lever, said solenoid having a plunger movable outwardly of its housing, when the solenoid is energized, a distance sufficient to move the paddle from raised to lowered position. When the solenoid is de-energized, the paddle will move to raised position due to the fact that one arm of lever 1113 is considerably longer than the other. The paddle is also capable of being raised by a push rod 1115 that is mounted immediately below the heavy end of lever 1113 on a tubular cross-brace 1117 of the table T′. The push rod 1115 is slidable in the cross-brace 1117 and, when the table is in elevated position, the rod assumes a lowered position. When the table approaches its lowermost position for receiving an empty pallet, the lower end of the push rod engages the floor. The push rod is then raised to engage the lever 1113 and swing it clockwise to lower the stop paddle 1112.

The program chain used with the palletizer of FIG. 40 is identical to that used on the palletizer of FIG. 1.

A cycle of operation of the palletizer of FIG. 40, starting with the operations that take place after a completed row of cases has been formed on the row accumulator RA will be described in connection with FIG. 41 and with the control diagrams of FIGS. 38 and 42 wherein M1 is the main drive motor, M4 is the motor driving the case feed conveyor, M2–D indicates the windings of motor M2 that drive the load elevator LE down, M2–U indicates the windings of motor M2 that cause the load elevator to be elevated, M3 is the drive motor for the table rollers 736, and M7 is the motor that drives the pallet feed conveyor 1100.

At the start of this cycle the load elevator LE′ will be considered to be in its uppermost position supporting a pallet directly beneath the layer stripper carriage LSC which is in its forward position holding the contacts of switch LS–13 in circuit 16 open. When start switch SW–1 is closed, the main motor M1 is energized through a circuit connected between lines L1–L2 which supply 115 volt A.C. current. An interlock M1–1 in circuit 2 keeps M1 energized. When motor M1 is energized, the rollers 600 of the layer stripper carriage will be rotated clockwise (FIG. 41).

When the first row of articles is diverted onto the stripper carriage, they are advanced over the layer stripper carriage, and the leading cases engage the actuator 51 of switch LS–10, opening contacts LS–10A in circuit 4 and closing contacts LS–10B in circuit 6. Also, the cases engage the radial fingers on the second roller 600A, causing LS–15 to be actuated, causing contacts LS–15A in circuit 6 to open and contacts LS–15B in circuit 8 to close, preparing a circuit to relay C. Two more rows of cases are diverted onto the layer stripper to complete a layer, as indicated in FIG. 36. When the second case of the next layer trips LS–A, contact P3 (FIG. 38) energizes relay E. Contacts E1 in circuit 8 close to energize relay C. When relay C is energized, contacts C–1 in circuit 17 close and the load stripper carriage brake 682 is energized, since normally open contacts B–1 are closed due to the fact that relay B in circuit 4 is energized through contacts LS–12A, contacts LS–1A in circuit 6 having been closed by the load table when it reached its upper position. Therefore, the brake 682 is released and the clutch 680, through contacts C–2, is energized to drive the layer stripper carriage rearwardly.

As the layer stripper retracts, the layer of cases moves off the rollers causing switch LS–15 to be released, whereby contacts LS–15A in circuit 6 close and contacts LS–15B in circuit 8 are opened to de-energize relay C. Contacts C–2 in circuit 18 open to de-energize the clutch 680 and permit the torsion spring on the layer stripper carriage to urge the stripper toward the front of the machine. The brake 682 remains energized, allowing the shaft 642 to continue rotating due to the fact that switch LS–13 in circuit 16 was allowed to close as the stripper was retracted.

Since contacts LS–15A in circuit 6 are now closed, contacts LS–10B are still held closed by the layer of cases, and contacts LS–1A were closed during upward movement of the load elevator, motor windings M2–D are energized to start the elevator down.

As the elevator moves down, the cases release the actuator 51 of switch LS–10, closing contacts LS–10A in circuit 4 and opening contacts LS–10B in circuit 6 to de-energize M2–D. The torsion spring then returns the stripper carriage to its position above the load elevator, the leading roller of the carriage contacting and opening switch LS–13 (circuit 16) to de-energize the brake and cause its to hold shaft 642 against rotation. Then the next layer of cases comes in row by row and the layer discharging and elevator lowering operations are repeated.

When a predetermined number of layers are on the table, the tab 938 on the elevator engages LS–12 closing contacts LS–12B in circuit 7. The motor windings M2–D are then energized through contacts LS–1A, LS–12B, LS–15A which are closed when the stripper is retracted and closed contacts M3–3. The load elevator is lowered, since the contacts LS–10B in circuit 6, which are opened when the cases pass out of contact with LS–10, are by-passed.

Switch LS–19 in circuit 9 is closed by the table at the loaded pallet discharge position and motor M3 is energized, switch LS–22 being held closed by the pallet on the table. Contacts M3–3 in circuit 6 are opened to de-energize M2–D and stop the descent of the elevator. Also, solenoid S in circuit 9A is energized to lower the stop paddle 1112.

As the load leaves the machine, switch LS–22 opens to de-energize motor M3, thereby closing contacts M3–3 in circuit 6 and energizing M2–D to move the elevator downwardly again, permitting LS–19 to open de-energizing solenoid S and allowing paddle 1112 to raise. When the elevator reaches its lowermost position, contacts LS–1A in circuit 6 are opened, de-energizing M2–D and stopping the elevator. As previously mentioned, when the elevator reaches its lowermost position the push rod 1115 again lowers the stop paddle 1112.

At the same time, the elevator actuates switch LS–18 in circuit 11 to start the empty pallet feed conveyor motor M7. The pallet feed conveyor moves an empty pallet onto the table T' which is now in alignment with the pallet feed conveyor. As the pallet reaches the desired position on the table, it actuates and opens switch LS–17 in circuit 11, thereby de-energizing the pallet conveyor motor M7. Contacts M7–2 in circuit 10 close, completing a circuit to the windings M2–U through previously closed contacts LS–1B to start the elevator upwardly once more.

As the elevator moves upwardly, the push rod 1115 slides downwardly, releasing the lever 1113 and permitting the lever to swing counterclockwise by gravity to raise the stop paddle alongside the pallet.

When the table reaches its upper position, it closes contacts LS–1A in circuit 6 and opens contacts LS–1B in circuit 10 to de-energize coils M2–U to stop the upward movement of the elevator. Accordingly, the empty pallet is now in position to receive the next layer of cases formed on the stripper carriage thereabove.

The feed conveyor FC, the case diverter CD, the case turner CT, the case pusher CP, the row accumulator RA, the row diverter RD, and the various actuating mechanisms associated with these units are in general identical to the units disclosed in the application of E. A. Verrinder, Ser. No. 247,081 filed December 26, 1962, as is the electric switch arrangements and the control circuit. The program chain is identical to that disclosed in the application of E. A. Verrinder and Francis Curtis, Ser. No. 247,143 which was filed on December 26, 1962, Patent No. 3,193,527 and is assigned to the assignee of the present application. Reference may be had to these two applications for further information on the parts of the present machine.

From the foregoing descriptions it will be seen that the present invention provides a particularly compact palletizer which has a main frame structure that need only be large enough to accommodate a vertically moving pallet elevator. Layers of cases are formed on a superstructure which, although it is elevated and out of the road of normal movement of people and material, is still of minimum dimensions being made up of the upper end of the elevator structure and a relatively narrow case conveying system on two sides of the upper end of the elevator structure. The compact arrangement of the palletizer is completed by one of two uniquely positioned pallet feed conveyors. It is to be particularly noted that the palletizer of the present invention is so arranged that there is no need for a layer accumulating area at the upper end of machine nor of a pallet storage chamber equipped with a pallet elevator. Lastly, the use of a flexible layer stripper carriage which is capable of moving to a vertical position alongside the elevator contributes in a large measure to making possible the unique, compact palletizer of the present invention.

Having thus described the invention, what is claimed as new, and for which the protection of Letters Patent is desired, is:

1. In a machine for palletizing articles, a support structure, a pallet elevator mounted for vertical movement in said structure, a discharge conveyor disposed at a first elevation adjacent a lower portion of said structure and adapted to receive loaded pallets from said elevator, when said elevator is stopped at said first elevation, and a pallet feed conveyor disposed at a second elevation below said discharge conveyor and arranged to deliver empty pallets to said elevator when said elevator is at said second elevation.

2. In a machine for palletizing articles, a support structure, a pallet elevator mounted for vertical movement in said structure, a stripper carriage mounted on said structure and having a portion movable from a generally horizontal position above the path of vertical movement of said elevator to a generally vertical position along one side of said structure, a discharge conveyor disposed at a first elevation adjacent a lower portion of the opposite side of said structure and adapted to receive loaded pallets from said elevator when said elevator is stopped at said first elevation, and a pallet feed conveyor disposed at a second elevation below said discharge conveyor and arranged to deliver empty pallets to said elevator when said elevator is at said second elevation.

3. In a machine for palletizing articles, a support structure, a pallet elevator mounted for vertical movement in said structure, a discharge conveyor disposed at a first elevation adjacent a lower portion of said structure and adapted to receive loaded pallets from said elevator when said elevator is stopped at said first elevation, first power means for transferring a loaded pallet from said elevator to said discharge conveyor, a pallet feed conveyor disposed at a second elevation below said discharge conveyor and arranged to deliver empty pallets to said elevator when said elevator is at said second elevation, second power means for actuating said pallet feed conveyor, means for moving said elevator vertically in said structure, and control means operatively connected to said first and second power means and responsive to the arrival of said elevator at said first elevation for energizing said first power means to transfer a loaded pallet to said discharge conveyor and responsive to the arrival of said elevator at said second elevation for energizing said second power means to feed an empty pallet onto said elevator.

4. In a machine for palletizing articles, a support structure, a pallet elevator mounted for vertical movement in said structure, a stripper carriage mounted in an elevated portion of said structure for movement between a generally horizontal article-receiving position and a generally vertical retracted position, a single lane article feed conveyor mounted alongside said carriage, means for forming rows of articles one row at a time on said conveyor and discharging each row laterally of said conveyor directly onto said carriage when said carriage is in said article-receiving position, means for moving said elevator vertically in said carriage, means for moving said stripper carriage to retracted position when said elevator is in an upper position holding a pallet immediately below said stripper whereby articles on said stripper will be deposited on the pallet as the carriage is retracted, a discharge conveyor disposed at a first elevation adjacent a lower portion of said structure and adapted to receive loaded pallets from said elevator when said elevator is stopped at said first elevation, and a pallet feed conveyor disposed at a second elevation below said discharge conveyor and arranged to deliver empty pallets to said elevator when said elevator is at said second elevation.

References Cited by the Examiner

UNITED STATES PATENTS

| | | |
|---|---|---|
| 2,323,174 | 6/1943 | Wikle. |
| 2,815,870 | 12/1957 | Laub. |
| 2,859,965 | 11/1958 | Pabst. |
| 2,883,074 | 4/1959 | Boehl et al. |

GERALD M. FORLENZA, *Primary Examiner.*

M. TEMIN, M. WOLSON, *Assistant Examiners.*